(12) United States Patent
Oz et al.

(10) Patent No.: US 10,929,819 B2
(45) Date of Patent: Feb. 23, 2021

(54) ON-DEMAND AND ON-SITE VEHICLE MAINTENANCE SERVICE

(71) Applicant: Continental Intelligent Transportation Systems, LLC, Santa Clara, CA (US)

(72) Inventors: Seval Oz, San Jose, CA (US); Yao Zhai, Fremont, CA (US); Adrian Ramos Aguayo, San Jose, CA (US); Sudeep Kaushik, Fremont, CA (US); Nikolas Bergerhoff, North Vancouver (CA)

(73) Assignee: Continental Intelligent Transportation Systems, LLC, Santa Clara, CA (US)

(*) Notice: Subject to any disclaimer, the term of this patent is extended or adjusted under 35 U.S.C. 154(b) by 354 days.

(21) Appl. No.: 15/761,982

(22) PCT Filed: Sep. 2, 2016

(86) PCT No.: PCT/US2016/050070
§ 371 (c)(1),
(2) Date: Mar. 21, 2018

(87) PCT Pub. No.: WO2017/053046
PCT Pub. Date: Mar. 30, 2017

(65) Prior Publication Data
US 2018/0285832 A1    Oct. 4, 2018

Related U.S. Application Data

(60) Provisional application No. 62/221,511, filed on Sep. 21, 2015.

(51) Int. Cl.
*G06Q 10/00* (2012.01)
*H04W 4/44* (2018.01)
(Continued)

(52) U.S. Cl.
CPC ............ *G06Q 10/20* (2013.01); *G07C 5/006* (2013.01); *G07C 5/008* (2013.01); *G08G 1/205* (2013.01); *H04W 4/44* (2018.02)

(58) Field of Classification Search
None
See application file for complete search history.

(56) References Cited

U.S. PATENT DOCUMENTS 6,028,537 A * 2/2000 Suman ............... B60K 35/00
340/988
8,645,014 B1 * 2/2014 Kozlowski ............ H04W 4/70
701/24

(Continued)

OTHER PUBLICATIONS

Tesla starts offering 'no-touch' service by remotely unlocking car to mobile technician, Fred Lambert, www.electrek.co (Year: 2020).*

(Continued)

*Primary Examiner* — Dennis W Ruhl

(57) ABSTRACT

A cloud based system for vehicle maintenance to a target vehicle includes a cloud based on-site vehicle maintenance service. A GPS-based proximity module in a first server associated with the on-site vehicle maintenance service receives both current GPS coordinates of a service vehicle associated with a first maintenance and service provider and current GPS coordinates of the target vehicle of a customer. The current GPS coordinates are used for at least one maintenance and service delivery session with the target vehicle of the customer. The vehicle maintenance and service operation includes 1) directing the service vehicle to the target vehicle of the customer, 2) opening and/or unlocking the target vehicle of the customer, 3) ensuring the one or more vehicle maintenance and service jobs have been performed, and 4) ensuring the target vehicle of the customer is closed and locked.

8 Claims, 25 Drawing Sheets

(51) Int. Cl.
*G07C 5/00* (2006.01)
*G08G 1/00* (2006.01)

(56) References Cited

U.S. PATENT DOCUMENTS

| | | | |
|---|---|---|---|
| 9,384,491 B1* | 7/2016 | Briggs | H04W 4/02 |
| 9,412,130 B2* | 8/2016 | Wasserman | H04W 4/40 |
| 2004/0185842 A1 | 9/2004 | Spaur et al. | |
| 2009/0093236 A1* | 4/2009 | Balan | H04L 67/16 |
| | | | 455/411 |
| 2010/0332133 A1* | 12/2010 | Harris | H04L 67/12 |
| | | | 701/431 |
| 2011/0234427 A1 | 9/2011 | Ingram et al. | |
| 2015/0120402 A1* | 4/2015 | Ahmed | G06Q 30/06 |
| | | | 705/13 |
| 2016/0096508 A1* | 4/2016 | Oz | H04W 4/029 |
| | | | 701/36 |
| 2016/0098870 A1* | 4/2016 | Bergerhoff | G07C 9/20 |
| | | | 340/5.61 |

OTHER PUBLICATIONS

International Search Report and Written Opinion dated Nov. 28, 2016 from corresponding International Patent Application No. PCT/US2016/050070.

* cited by examiner

| VEHICLE INFO | |
|---|---|
| DF NISSAN TEANA 2013 | MILEAGE 13.890 |
| | VIN 1ZVBP8KZ1ES2S8839 |
| | BODY STYLE SEDAN |
| | EXTERIOR COLOR PEARL WHITE |
| | INTERIOR COLOR CHARCOAL BLACK |
| | FUEL E-85/GASOLINE |
| | TRANSMISSION 6-SPEED AUTOMATIC WITH AUTO-SHIFT |
| | DRIVETRAIN FRONT WHEEL DRIVE |
| | DOORS 4 |
| | ENGINE 2.0 XL SPORTY 14 DOHC |
| | EQUIPMENT STANDARD |

SERVICE SCHEDULE

| DATE | TIME | MILEAGE | SERVICE TYPE | LOCATION | FAULT RELATED | ASSIGNEE |
|---|---|---|---|---|---|---|
| 6/12,2015 | 09:00-10:00 | -- | OIL CHANGE | IN THE FIELD | -- | DAVID STLANY |
| 6/14,2015 | 14:00-15:00 | -- | ENGINE CHECK | ON SLTE | P0562, P02020 | TOM SMLTH |
| 7/29,2015 | 14:00-18:00 | -- | CLUB GATHERING | ON SLTE | -- | SALES GROUP |
| 9/30,2015 | -- | 18.000 | GENERAL SERVICES | ON SLTE | -- | -- |
| -- | -- | 30.000 | GENERAL SERVICES | ON SLTE | -- | -- |

VEHICLE FAULT LIST

| NO | FAULT NAME | FAULT CODE | FAULT HAPPENING TIME | | CRITICALITY |
|---|---|---|---|---|---|

POWERIRAIN

| 1 | CHARGING SYSTEM VOLTAGE LOW | P0562 | 04/28,2015 | 16:34 | HIGHT |

FIG. 11B

ON-DEMAND AND ON-SITE VEHICLE MAINTENANCE SERVICE

FIELD

The design generally relates to a maintenance and service delivery to a vehicle system.

BACKGROUND

Typically, vehicle maintenance and service are performed at a shop. This technology instead delivers vehicle maintenance and services to a customer's vehicle in the field (outside the shop) while ensuring the vehicle is secure after the service.

SUMMARY

In an embodiment, a cloud based system for vehicle maintenance to a target vehicle includes a cloud based on-site vehicle maintenance service hosted a cloud based provider site that has one or more servers each having one or more processors. The servers are configured to communicate with one or more databases in the cloud based provider site. A GPS-based proximity module is in a first server associated with the on-site vehicle maintenance service and is configured to receive both current GPS coordinates of a service vehicle associated with a first maintenance and service provider and current GPS coordinates of the target vehicle of a customer. The current GPS coordinates are used for at least one maintenance and service delivery session with the target vehicle of the customer. Both the current GPS coordinates of a client device associated with the service vehicle and the coordinates of the customer's target vehicle are stored in a first database of the cloud based provider site. The GPS-based proximity module is configured to monitor a distance between the service vehicle and the target vehicle of the customer. A security module in the first server associated with the on-site vehicle maintenance service is configured to setup the vehicle maintenance and service operation. The vehicle maintenance and service operation includes 1) directing the service vehicle to the target vehicle of the customer, 2) opening and/or unlocking the target vehicle of the customer to ensure one or more vehicle maintenance and service jobs can be performed on the target vehicle of the customer, 3) ensuring the one or more vehicle maintenance and service jobs have been performed, and 4) after performing the one or more vehicle maintenance and service jobs, ensuring the target vehicle of the customer is closed and locked and the one or more vehicle maintenance and service jobs are complete. The security module in cooperation with the GPS-based proximity module is further configured to send to the target vehicle of the customer one or more functional commands. The functional commands can include 1) to wake-up an on-board actuation module in the target vehicle of the customer while in a close proximity established by a first threshold distance between the service vehicle and the target vehicle of the customer, 2) to give an alert from the target vehicle of the customer while in a close proximity established by a second threshold distance between the service vehicle and the target vehicle of the customer, 3) to unlock a door of the target vehicle of the customer, 4) to turn on or off an engine of the target vehicle of the customer, and 5) to lock the doors of the target vehicle of the customer. The doors of the target vehicle are locked after i) verifying the engine of the target vehicle of the customer is turned off and ii) receiving a confirmation of a completion of the vehicle maintenance and service operation from the service vehicle.

In an embodiment, the cloud based on-site vehicle maintenance service is hosted on a cloud-based provider site that contains one or more servers and one or more databases. The cloud based on-site vehicle maintenance service provides a single common end-to-end solution between two or more maintenance and service providers and two or more OEM telematics systems without additional hardware needing to be installed in the vehicle by using one or more application programming interfaces and using downloadable applications resident on client devices.

In an embodiment, the cloud based on-site vehicle maintenance service hosted on a cloud based provider site contains two or more servers and two or more databases. The cloud based on-site vehicle maintenance service uses two or more paired-virtual keys, such as a dual-key protection mechanism, via secure key matching authentication in order to render hacking any single system's server useless. Additionally, the virtual keys are given a shelf life to limit authorized maintenance and service delivery and subsequent activation of the vehicle's actuation module to within a specified time window.

In an embodiment, the cloud based on-site vehicle maintenance service hosted on a cloud based provider site contains two or more servers and one or more databases. The cloud based on-site vehicle maintenance service uses a Global Positioning System (GPS)-based proximity system to control and track the vehicle maintenance and service operation, to speed up the vehicle maintenance and service operation, and to ensure security for the vehicle maintenance and service operation. The cloud based on-site vehicle maintenance service also uses a mobile delivery notice to verify the origination of the service delivery order as well as to communicate a successful vehicle maintenance and service operation.

In an embodiment, a method for the on-site vehicle maintenance service is discussed. The on-site vehicle maintenance service is an alternative maintenance and service delivered in the field (outside a workshop) and includes a number of example steps. A consumer selects one or more vehicle maintenance and service jobs at a website of an on-site vehicle maintenance service provider or at another on-line site. The customer selects an on-site vehicle maintenance offered on a user interface of the cloud based provider to have the one or more vehicle maintenance and service jobs delivered to and/or performed on a consumer's vehicle outside a workshop of the maintenance and service provider. The on-site vehicle maintenance service request for the consumer's vehicle outside the workshop of the maintenance and service provider is processed. A service vehicle is directed to the consumer's vehicle's location. The consumer's vehicle is unlocked and/or opened to ensure the one or more vehicle maintenance and service jobs can be performed on the consumer's vehicle. An application presents a user interface to confirm that the one or more vehicle maintenance and service jobs have been performed. After performing the one or more vehicle maintenance and service jobs, the consumer's vehicle is closed and locked and the application sends a notice confirming that the one or more vehicle maintenance and service jobs are complete.

BRIEF DESCRIPTION OF THE DRAWINGS

The multiple drawings refer to the example embodiments of the design.

Figure 1:
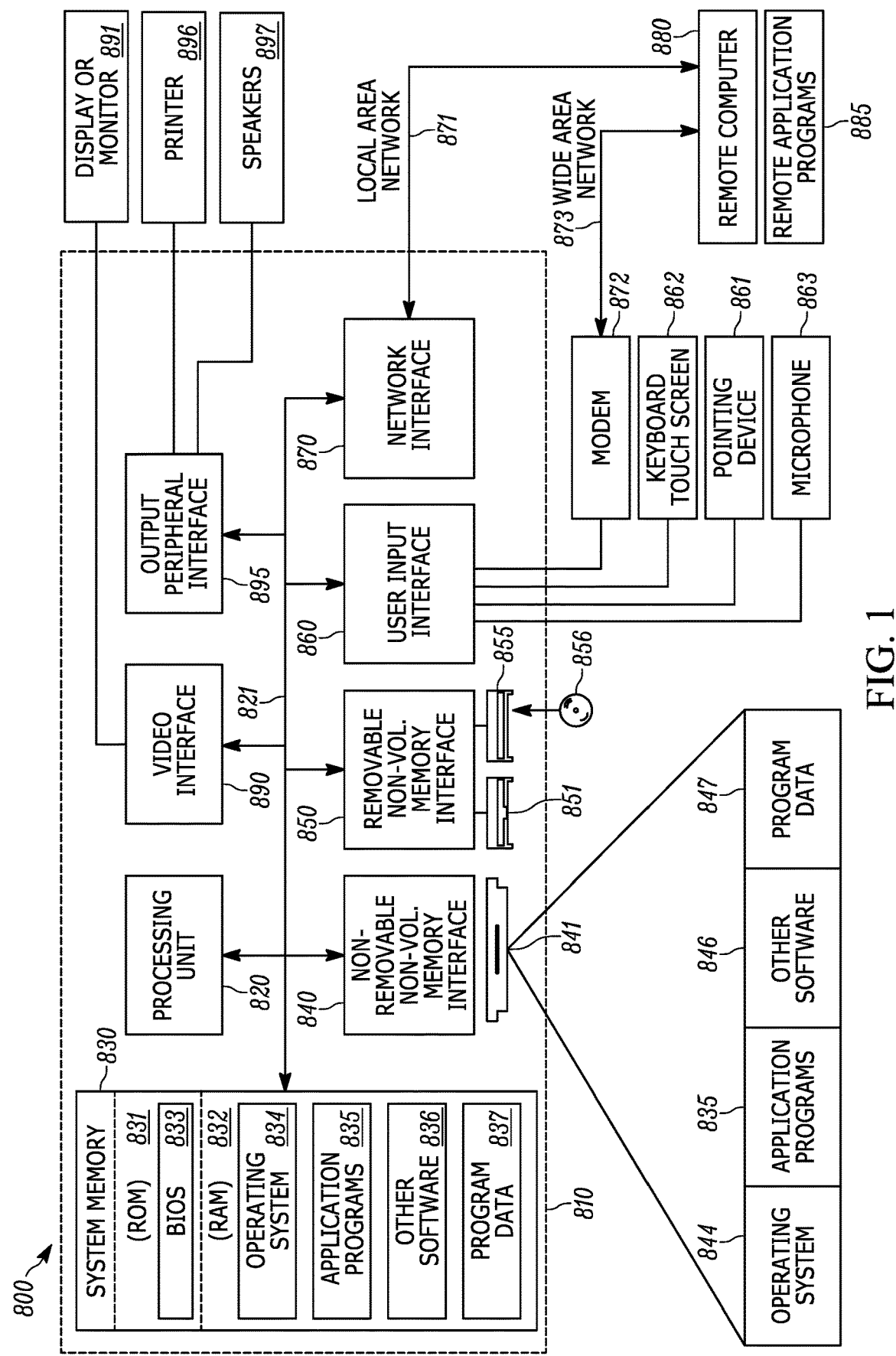
FIG. 1 illustrates a block diagram of an example computing system that may be used in an embodiment of one or more of the servers, in-vehicle electronic modules, and client devices discussed herein.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific vehicle maintenance services, named components, connections, number of databases, etc., in order to provide a thorough understanding of the present design. It will be apparent; however, to one skilled in the art that the present design may be practiced without these specific details. In other instances, well known components or methods have not been described in detail but rather in a block diagram in order to avoid unnecessarily obscuring the present design. Thus, the specific details set forth are merely exemplary. The specific details discussed in one embodiment may be reasonably implemented in another embodiment. The specific details may be varied from and still be contemplated to be within the spirit and scope of the present design.

In general, the on-site vehicle maintenance service for a vehicle facilitates service delivery to a vehicle at home or work. The on-site vehicle maintenance service may be hosted on a cloud-based provider site. The on-site vehicle maintenance service hosted on a cloud-based provider site may use onboard actuation module for commanding the vehicle such as locking and unlocking the vehicle. The on-site vehicle maintenance service may use an already existing telematics module of the vehicle as the onboard actuation module or may install a dongle module as the actuation module. If the telematics system is used, the on-site vehicle maintenance service can receive data such as GPS coordinates of the vehicle from the telematics module of the vehicle or can send command to the telematics module of the vehicle through the telematics provider. Alternatively, the on-site vehicle maintenance service can use a dongle module having a Wi-Fi or cellular communication circuit configured to establish a secure communication with a cloud based server associated with the on-site vehicle maintenance service. The dongle module can be coupled to an electro-mechanical activation circuit configured to cooperate with a fault and diagnostic module installed in the target vehicle of the customer to retrieve diagnostic data including the GPS coordinates of the vehicle of the user.

Alternatively, no actuation module using Wi-Fi or cellular communications may be installed in the vehicle. An installed remote keyless entry module manufactured as part of the vehicle may be used. Or, the dongle module can also implement RF circuitry to operate like a remote keyless entry module. The on-site vehicle maintenance service can receive the GPS coordinates of the vehicle from a client device (e.g., a mobile phone) of the user and can also be supplied a universal key fob simulator, such as a smart phone with an application, implementing appropriate RF frequencies, rolling security code, and commands to a client device of a service vehicle.

The on-site vehicle maintenance service can use two or more paired-virtual keys, such as a dual-key protection mechanism, via secure key matching authentication in order to render hacking any single system's server useless. Additionally, the virtual keys are given a shelf life to limit authorized service delivery and subsequent activation of the vehicle's actuation module to within a specified time window. The on-site vehicle maintenance service may not store the user credentials in its databases and, in general, only encrypted data is transmitted from the cloud-based on-site vehicle maintenance service and i) the applications resident on client devices, ii) the maintenance and service providers, and iii) the OEM telematics systems.

Figure 9:
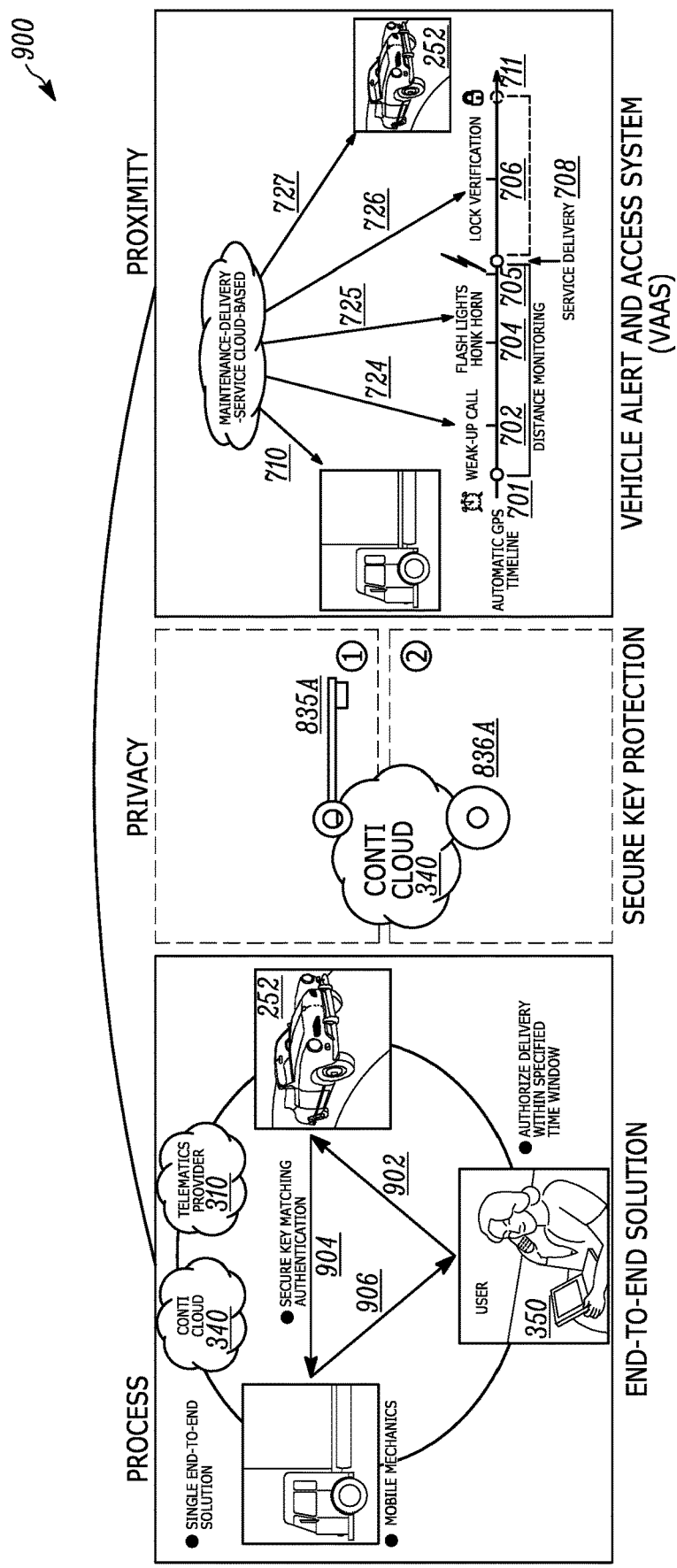
FIG. 9 illustrates a block diagram overview of an embodiment of the on-site vehicle maintenance service hosted on a cloud based system and some of its features including i) process connectivity to multiple platforms, ii) built in privacy and security, and iii) a vehicle awake and alert system via proximity.

The universal key fob simulator is configured with an enhanced broadcast range, such as up to several hundred meters, compared to the broadcast strength of a typical key fob. This assists in finding the target vehicle with the geo proximity vehicle alert and access system. The on-site vehicle maintenance service uses a GPS-based proximity system to control and track the vehicle maintenance and service operation, to speed up the vehicle maintenance and service operation, and to ensure security for the vehicle maintenance and service operation. The on-site vehicle maintenance service also uses a mobile delivery notice to verify the origination of the service delivery order as well as to communicate a successful on-site vehicle maintenance service. The on-site vehicle maintenance service delivers service to wherever vehicle is parked, including the service can deliver services to a rental car while on business trip. (See FIG. 9 for a block diagram overview of an embodiment of the on-site vehicle maintenance service hosted on a cloud-based and some of its features including i) process connectivity to multiple platforms, ii) built in privacy and security, and iii) a vehicle awake and alert system via proximity). The on-site vehicle maintenance services may include changing the oil, the tires, engine parts such as an air filter, rotate the tires, detailing/cleaning the car, changing the windshield, store or move a vehicle, etc.

Also, the universal key fob simulator, such as a smart phone or other handheld device, is configured with an antenna and transmission circuit to transmit at the specific frequency that the target car's remote keyless module, such as a Body Control Module, is anticipating and configured to receive signals/commands at, such as 444 MHz. The Radio Frequency transmitter can transmit in a range, for example, between 3 to 400 MHz using a series of phase-locked loop frequency control circuits. The Body Control Module has a receiver circuit tuned to a specific frequency, such as 444 MHz, corresponding to the frequency transmitter by the key fob simulator. The Body Control Module is located inside the target vehicle in order to unlock the vehicle needs to receive both one of 1) the rolling security key codes that is within the acceptable window of synchronization and 2) at the specific RF frequency from the universal key fob and 3) potentially one or more commands regarding the vehicle, such as unlock or transmit GPS coordinates. Both the universal key fob simulator and the Body Control Module can use the same pseudo-random number generator for the rolling security key codes. Alternatively, a backend server and database system uses the same pseudo-random number generator as the corresponding target vehicle type and then generates a set of rolling security key codes. The backend server sends merely the generated set of rolling security key codes to the universal key fob simulator. The universal key fob simulator has the access control telegram message for that type of vehicle stored and exchanges the access control telegram message and valid rolling security key code with the the target car's remote keyless module.

Additionally, the universal key fob simulator is configured to send commands to turn the engine of the target vehicle on/off. The protocols and commands may be generated and stored locally on the universal key fob simulator. Alternatively, the protocols and commands may be also generated and stored by the backend server and database and then sent to the universal key fob simulator upon request. The universal key fob simulator is configured to communicate with the target vehicle to cooperate with the immobiliser circuit to turn the engine of the target vehicle on/off. The universal key fob simulator is configured to disengage the immobilizer circuit and activate the ignition circuit without inserting a physical key in the ignition.

Figure 2A:
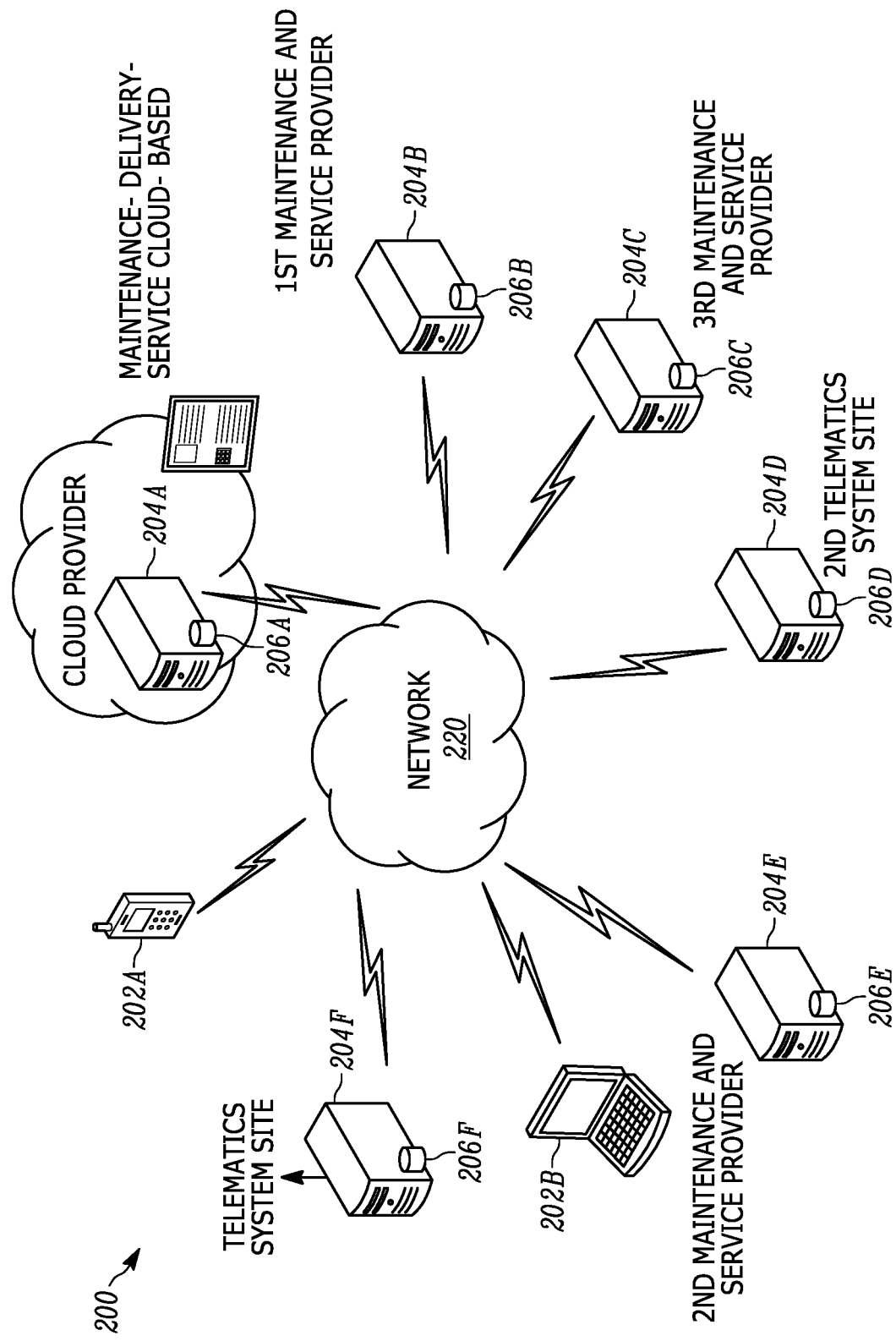
FIGS. 2A-2B illustrate block diagrams of embodiments of the on-site vehicle maintenance service hosted on a cloud-based provider site.
Figure 2B:
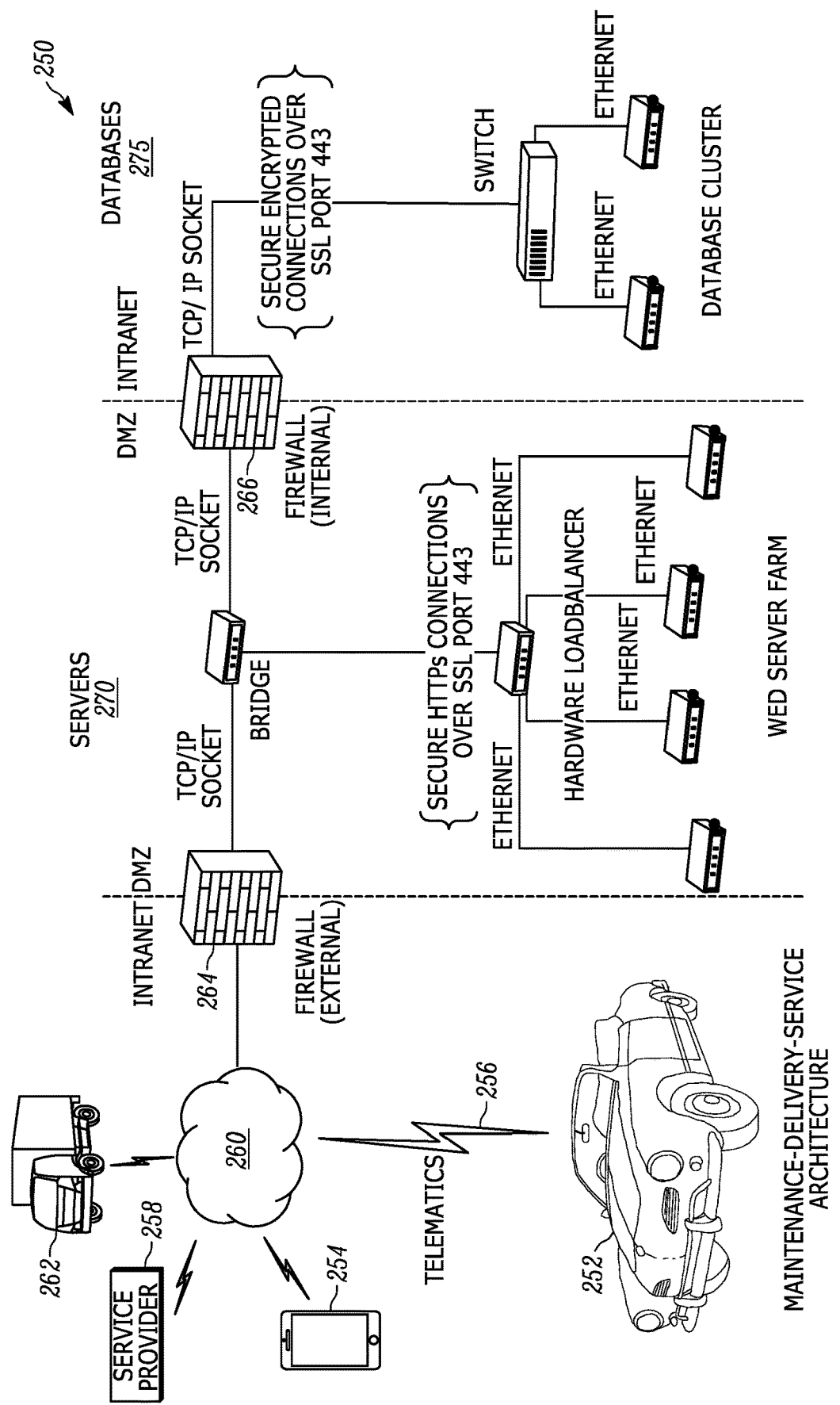

Example processes for and apparatuses to provide an automated process workflow for the entire cloud based on-site vehicle maintenance service are described. The following drawings and text describe various example implementations of the design. FIG. 1 and FIGS. 2A-2B illustrate example environments to implement the concepts.

FIGS. 2A-2B illustrate block diagrams of embodiments of the on-site vehicle maintenance service hosted on a cloud based provider site. The web server farm may have examples of 4 servers and 2 database clusters. i) A user downloads and uses either i) a vehicle service (maintenance) delivery mobile application or ii) a vehicle service delivery desktop application on their client device to register with the cloud based vehicle maintenance system. The cloud based on-site vehicle maintenance service hosted on a cloud based provider site contains one or more servers and one or more databases. The one or more databases store at least i) User ID and Password for the on-site vehicle maintenance service, ii) User name, iii) email or contact phone number of the user, iv) Security questions, v) Vehicle VIN, vi) Vehicle make, model, color, year, and vii) any combination of at least three of these.

The cloud based on-site vehicle maintenance service can be implemented in software, hardware electronics, and any combination of both and when one or more portions of the system are implemented in software, then that software is tangibly stored in an executable format on the one or more non-transitory storage mediums to be executed by a processing component.

High Level Description of Each Transaction in Case of Dongle Module Solution

Figure 4A:
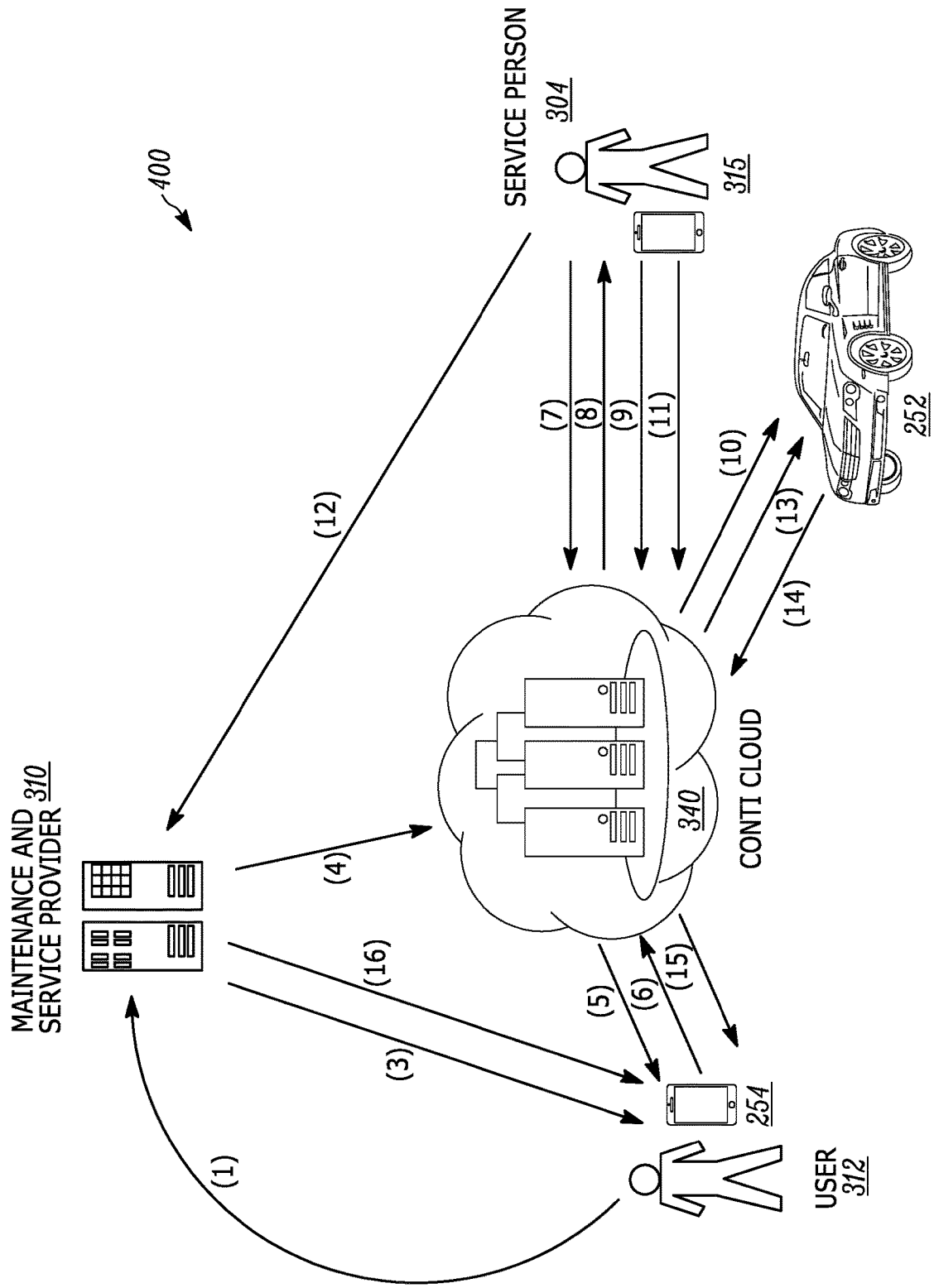
FIGS. 4A-4C illustrates block and flow diagrams of an embodiment of the alternative service delivery system using an example dongle module solution.
Figure 4B:
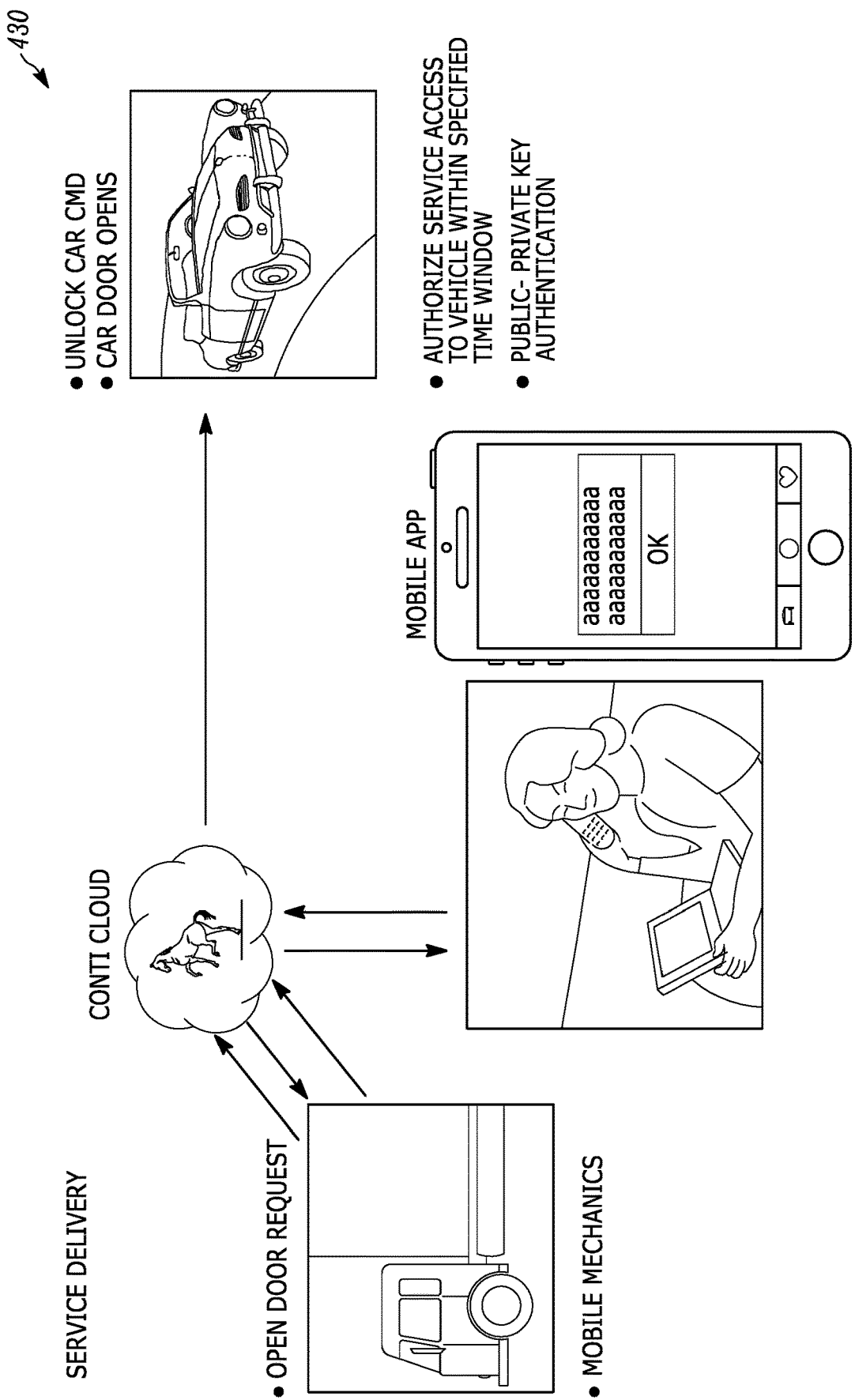
Figure 4C:
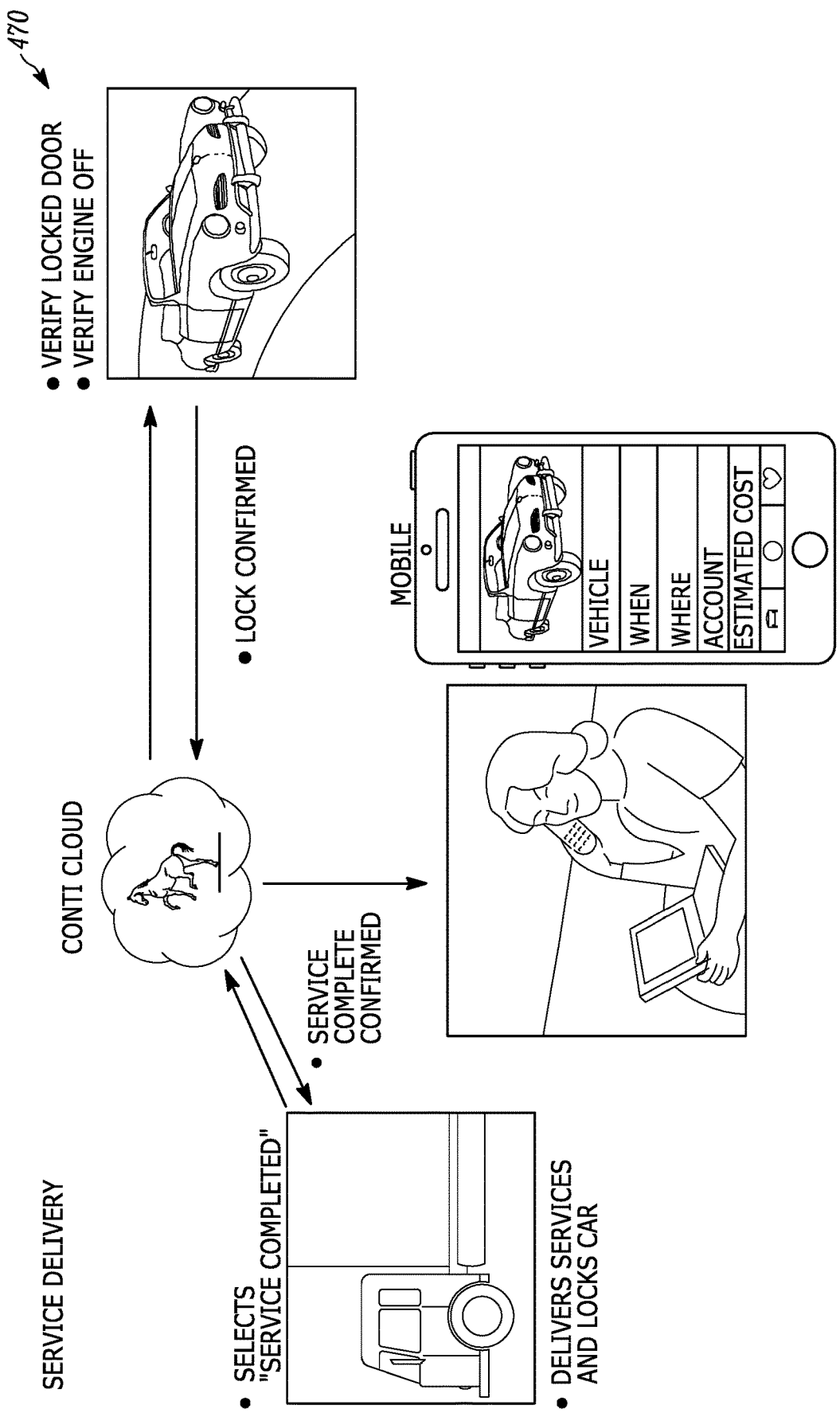

FIGS. 4A-4C illustrates block and flow diagrams of an embodiment of the alternative service delivery system using an example dongle module solution.

In an embodiment, a dongle module including a software application is configured to provide a new intelligence in a vehicle's navigation. The dongle module is configured to lead the way to an intelligent and expanded use of navigation data to control other vehicle systems. Additional hardware may be installed in the target vehicle to assist in the vehicle maintenance and service operation. The dongle module may be a small piece of hardware that attaches inside the vehicle to communicate with one or more modules manufactured into the vehicle in order to enable additional functions.

Figure 5A:
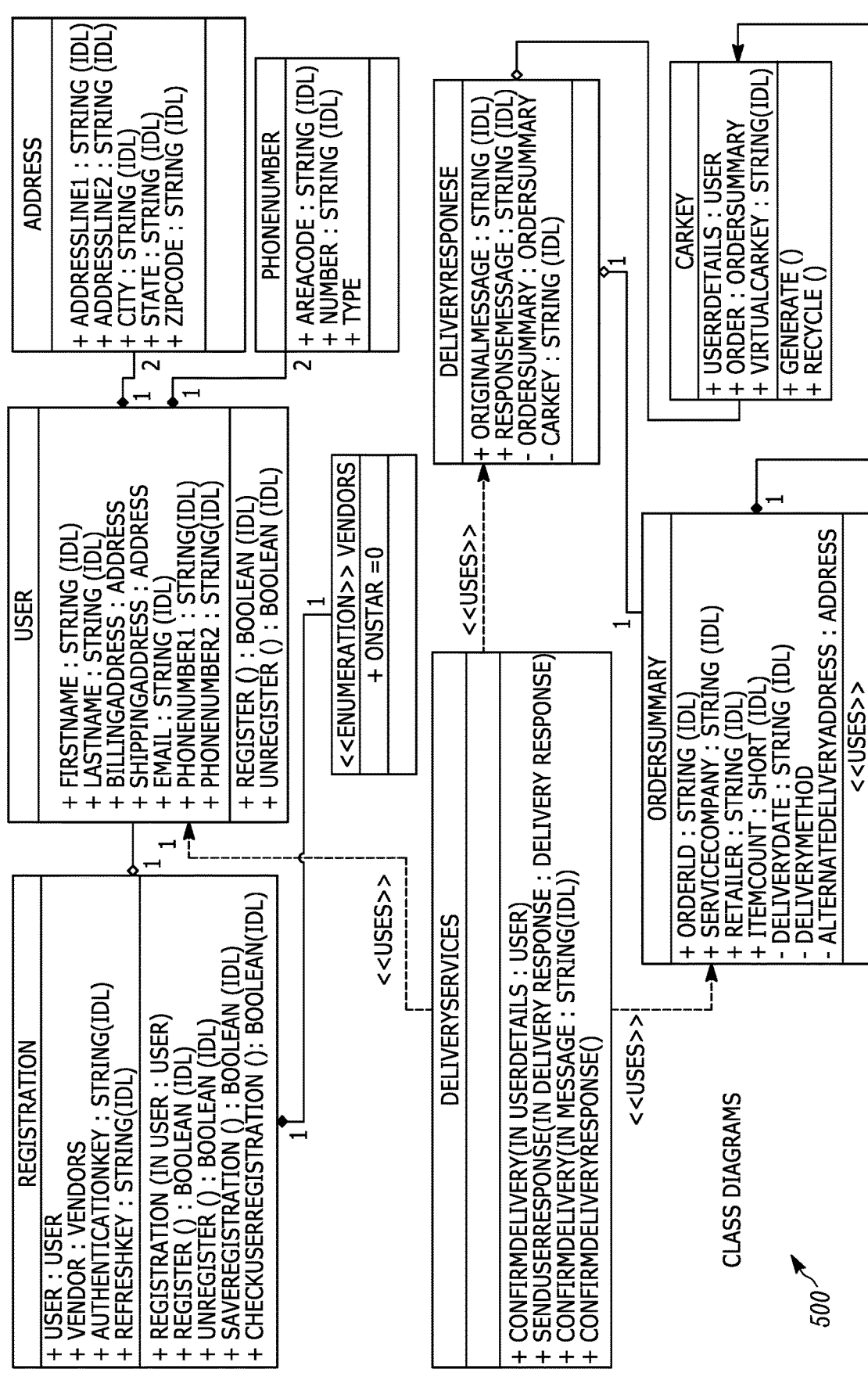
FIG. 5 illustrates an example class diagram of an embodiment of an application programming interface for the alternative service delivery system.
Figure 5B:
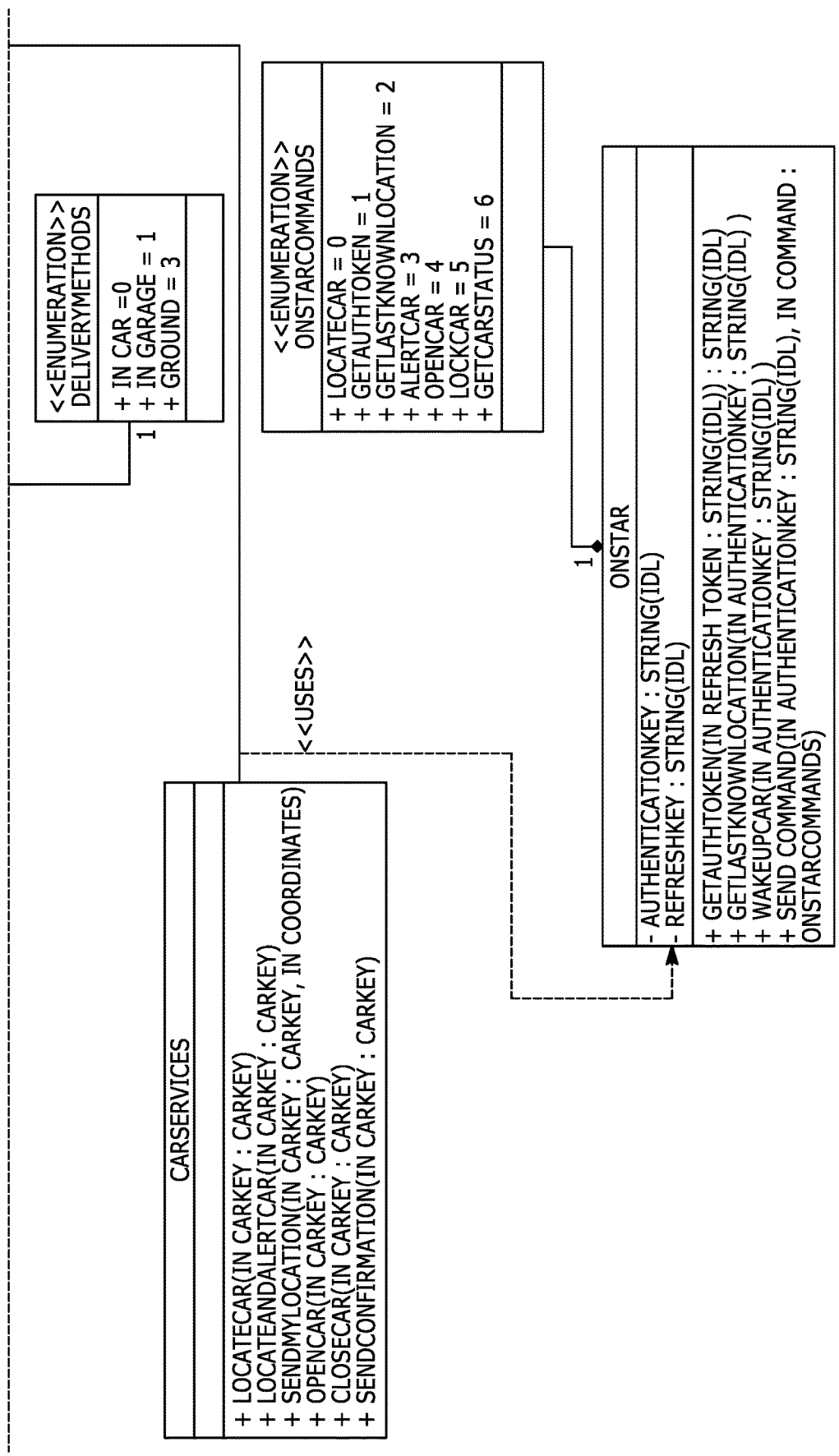

The on-site vehicle maintenance service is discussed. The system includes i) a cloud-based on-site vehicle maintenance service that is hosted on a cloud-based provider site, ii) one or more maintenance and service providers, having both a service website as well as one or more service vehicles with client devices having a delivery application resident in each client device. The cloud-based on-site vehicle maintenance service is configured to have Wi-Fi or cellular communications to the dongle module in order to exchange information including GPS coordinates of the vehicle and to cause electromechanical actions within that vehicle including: unlocking doors, opening windows, opening trunks, closing trunks, turning engine on, turning engine off, opening and closing a sunroof or moon roof. The cloud-based on-site vehicle maintenance service is hosted on a cloud-based provider site that contains one or more servers and one or more databases. The cloud-based on-site vehicle maintenance service is coded to utilize a protocol, including HTTP, to engage in a request and response cycle with either i) a mobile device application resident on a client device of the user, ii) a web-browser application resident on the client device of the user/customer, or iii) both. The cloud-based on-site vehicle maintenance service has one or more routines to automate the service delivery. The cloud-based on-site vehicle maintenance service has one or more open application programming interfaces to standardly exchange information between the two or more maintenance and service providers. (See FIG. 5 for an example class diagram of an embodiment of an application programming interface for the alternative vehicle maintenance system.) A hardware module already manufactured into the vehicle or added post manufacturing, such as a dongle module, in the vehicle then causes electromechanical actions within that given vehicle in order to allow the cloud-based on-site vehicle maintenance service to access a plurality of different kinds of vehicles, manufactured from a number of different manufactures. An example dongle module may cooperate with or be part of a navigation system in the vehicle. The cloud-based on-site vehicle maintenance service has a communication module scripted to establish a communication link with a communication terminal of the maintenance and service provider sites via a communication network. The cloud-based on-site vehicle maintenance service has an additional communication module scripted to exchange information with a delivery application on a client device in order to send or receive information from a vehicle service person. The cloud-based on-site vehicle maintenance service has an additional communication module for communicating to a user of the target vehicle having a maintenance service delivered to that vehicle, which is scripted to exchange information with a mobile application or desktop application on a client device of the user/customer. The vehicle maintenance service may be an oil change, a tire balance or rotation, a windshield repair or exchange and other similar repair or maintenance services. The vehicles include but are not limited to automobiles, trucks, vans, motorcycles, and other similar transportation mechanisms.

FIG. 4A illustrates a flow diagram of an embodiment of the alternative service delivery system using an example dongle topology including sequence of steps.

Figure 11A:
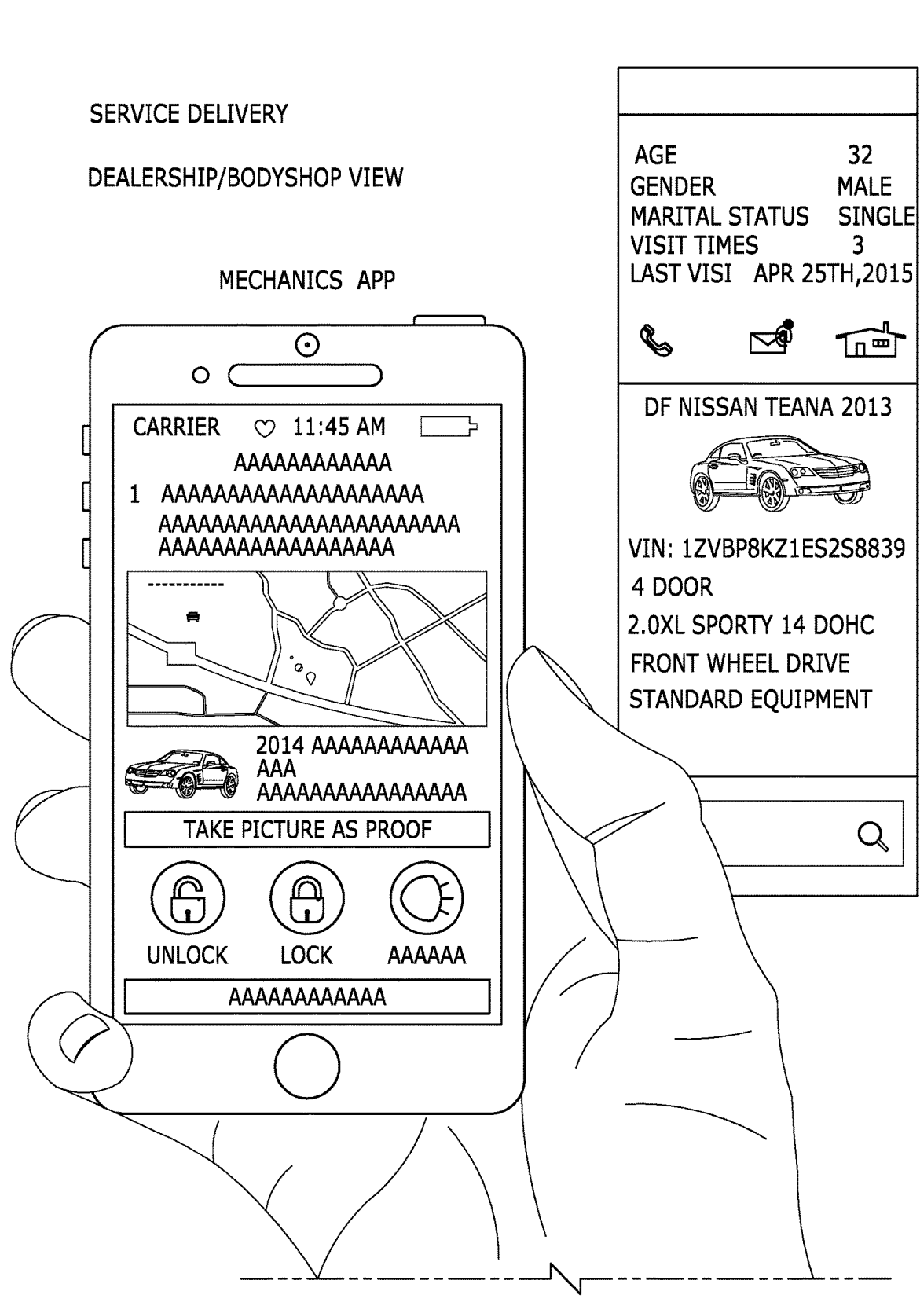
FIG. 11 illustrates a user interface for selecting by a customer at a website of a maintenance and service provider, one or more vehicle maintenance and service jobs including an "in the field service".

(1) The User uses either a mobile application on their client device or accesses a maintenance and service provider website via a browser on their client device (see, for example, FIG. 11). The maintenance and service provider website collects order information including the "in the field" maintenance orders selected. The client device submits order and vehicle information via the mobile application to the maintenance and service provider website, and in the case of delivering to a vehicle, the order includes the vehicle VIN. The user interface of the maintenance and service provider website offers the alternative delivery destination of the consumer's/user's vehicle as a service delivery destination. Note, the maintenance and service provider website user interface may show the alternative delivery destination of the consumer's/user's vehicle and an additional monetary charge may be associated with this alternative service delivery destination. The additional monetary charge may be charged on a per delivery instance basis or based on a subscription basis.

The maintenance and service provider website can supply a checkbox or button on its website such that by selecting the checkbox or button, the existence of a valid account on the cloud based system of on-site vehicle maintenance service and validity of user credentials for "in the field" service delivery may be verified. The verification can include one of 1) the maintenance and service provider website acquires the customer credentials and sends the customer credentials to the cloud based system of on-site vehicle maintenance service for verification, or 2) redirecting the customer to a login screen on the website of the cloud based system of on-site vehicle maintenance service such that the customer can enter the credentials. In either case, if the customer credentials are valid, the cloud based system of on-site vehicle maintenance service may verify the customer. Alternatively, if the customer does not have an account, the customer may register on the cloud based system of on-site vehicle maintenance service website and create an account. The customer credentials can include a username and a password and zero or more security questions.

(3) The maintenance and service provider sends confirmation including a Work Order Number to the User on their client device.

(4) The maintenance and service provider sends a notification to the cloud based system of on-site vehicle maintenance service, including Work Order Number and VIN via the standardized open application programming interface. The notification including the Work Order Number and VIN are stored in the databases associated with the on-site vehicle maintenance service. The maintenance and service provider may have already received, through a secure communication channel, a first virtual key, e.g., a public key, from the cloud based system of on-site vehicle maintenance service. The maintenance and service provider or a service vehicle associated with the maintenance and service provider can include the first virtual key with the communications to the cloud based system of on-site vehicle maintenance service so that the cloud based system of on-site vehicle maintenance service can match the public key with its associated private key and authenticate the communications.

(5) The cloud based system of on-site vehicle maintenance service sends a first notification to either the mobile application or the desktop application on their client device and confirms with the User their desire to have a maintenance and service job to their vehicle with the Work Order Number and VIN for the service delivery. The confirmation notice from the user also acts as a security mechanism to ensure that the user did in fact elect to have a service delivered to their vehicle. On or about the service delivery time, a second notification may be sent by the cloud based system of on-site vehicle maintenance service to the user on either the mobile application or the desktop application of their client device to reconfirm the delivery (see, for example, FIG. 12).

(6) After the first notification, the User can supply a response into either the mobile application or the desktop application on their client device to send permission to the cloud based system of on-site vehicle maintenance service. In response to the second notification, the user may supply a second confirmation including a virtual key or a security token of the vehicle. The cloud based system of on-site vehicle maintenance service has a multiple step, such as a two-phase, verification mechanism involving two security keys. The cloud-based infrastructure is scripted to validate authorization for the service delivery to a registered owner's vehicle. The source of initiating the request to open up the car is verified twice as the first virtual key coming along with a request from a maintenance and service provider or a service vehicle associated with the maintenance and service provider is verified. Also, a second car actuation security token such as a second virtual key is coming from the client device associated with the user. The second virtual key can be a rolling security key of a Body Control Module (BCM) of the target vehicle of the customer.

As described, the first virtual key is provided by the cloud based system of on-site vehicle maintenance service using a secure communication to the maintenance and service provider. The maintenance and service provider can supply the first key to a client device in the service vehicle or to a client device of the service delivery person. The first key can be used by the cloud based system of on-site vehicle maintenance service to validate commands/request/data received from maintenance and service provider, service vehicle, or a client device associated with the delivery person when the received command/request/includes the first virtual key. In an example, the first key is a public key generated by the cloud based system of on-site vehicle maintenance service such that only the cloud based system of on-site vehicle maintenance service knows an associated private key matching the public key and can authenticate the received command/request/data which include the first virtual key.

As an example, the first virtual key can be a public key selected from a pool of virtual keys in a first database associated with the on-site vehicle maintenance service. The first virtual key can be supplied through the maintenance and service provider to the client device of the service vehicle.

The pool of virtual keys can include one or more public keys and associated private keys. The received first virtual key is used by the security module of the first server associated with the on-site vehicle maintenance service to authenticate communications received from the service vehicle.

(7) After the service vehicle arrives at the same city, the service delivery person can use an application in their client device to send the Work Order Number to the cloud based system of on-site vehicle maintenance service in order to obtain vehicle location information.

Upon approaching the target vehicle, a service delivery application in the client device of the service delivery person can send a request to the cloud based system of on-site vehicle maintenance service to wake up the dongle module of the target vehicle by either automatically detecting a close proximity by the first threshold distance between the service vehicle and the target vehicle or can be prompted by the service delivery person to send the request. Alternatively, the distance between the service vehicle and the target vehicle can independently be monitored by the cloud based system of on-site vehicle maintenance service and the request can be sent without service delivery application's or service delivery person's involvement. The dongle module may be in a sleep-mode as this prevents battery drain when vehicle is not in use and thus the dongle module needs to be sent a wake up notice. The cloud based system of on-site vehicle maintenance service via the one or more application programming interfaces sends one or more wake up requests to the dongle module to wake up the vehicle. Alternatively, the GPS based proximity module in the cloud based system of on-site vehicle maintenance service can calculate the distance between the delivery vehicle and the target vehicle and send the wake up message. In an embodiment, the wake up message can be initiated either manually by the service delivery person, or automatically by the GPS based proximity module in the cloud based system of on-site vehicle maintenance service. In an example, the dongle module may not drain battery power or may drain very little battery power thus may not go to sleep. In such case, the waking up step can be omitted.

(8) After step 6 the cloud based system of on-site vehicle maintenance service has tracked the vehicle's location and sends it out upon a request from the service delivery person. Vehicle Alert and Access System (VAAS) Via a GPS-Based Proximity Control:

Additionally, the distance between the GPS coordinates of the service vehicle having a delivery application resident in a client device in the delivery vehicle and the target vehicle's GPS coordinates as periodically received from the dongle module is monitored and compared by a GPS based proximity module in the cloud based system of on-site vehicle maintenance service.

Figure 7A:
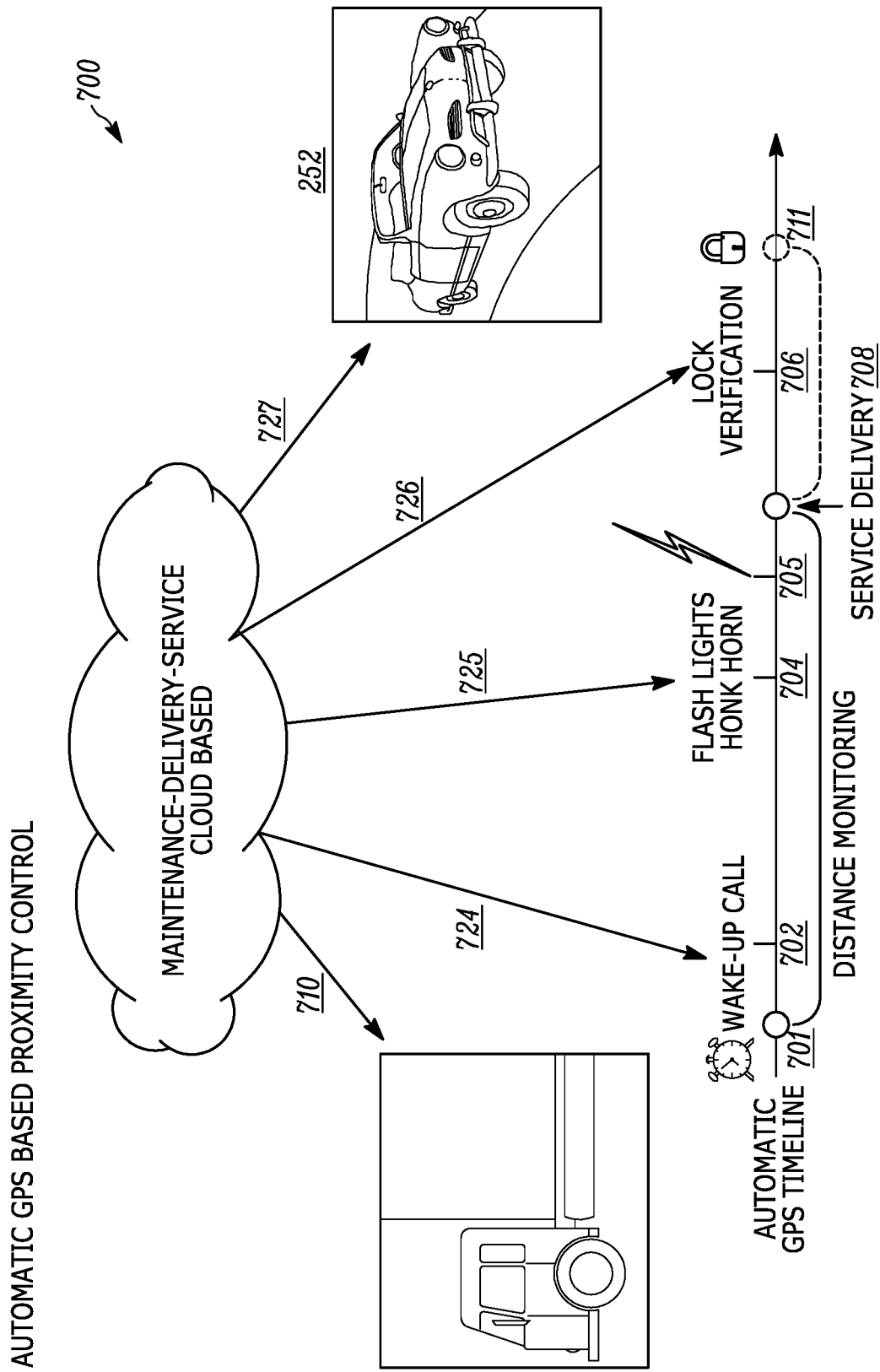
FIGS. 7A and 7B illustrate block and flow diagrams of embodiments of the GPS-based control and tracking mechanisms used for service delivery to the vehicle.

The GPS based proximity module in the cloud based system of on-site vehicle maintenance service via the one or more application programming interfaces sends one or more wake up requests to the dongle module to wake up the target vehicle as the service vehicle arrives near the target vehicle. However, without the advanced sequence of wake up requests, the target vehicle's dongle module may be in sleep mode and a service delivery person might be forced to wait 10 minutes or more to unlock the door. This wake up control insures an Unlock Vehicle command will execute immediately when the service delivery truck arrives since the vehicle is awake. In order to prevent a delay due to in-vehicle power saving mode, the vehicle's dongle module is sent a command (e.g., send your GPS coordinates) to execute the command before the service delivery truck arrives at the location of the target vehicle to keep the target vehicle awake so that the target vehicle respond immediately to a command to unlock the door (see, for example, FIG. 7A). This improves productivity since the vehicle can be opened immediately when the service delivery truck arrives, since the vehicle is awake and ready to accept commands. Alternatively as noted above, the dongle module may not drain battery power or may drain very little battery power thus may not go to sleep and the waking up step can be omitted. Note, in an example, for security, the cloud based system of on-site vehicle maintenance service will grant access to the vehicle only once. Subsequent requests will not unlock the vehicle even if correct virtual key and valid time window are present.

(9) After the service delivery person of the service vehicle approaches the target vehicle, a request is sent to the cloud based system of on-site vehicle maintenance service to blink the hazard lights and/or unlock the target vehicle.

A GPS-based proximity module in the cloud based system of on-site vehicle maintenance service will also send a request via the one or more application programming interfaces to the dongle module to cause a localized alert in the target vehicle so that the vehicle can blink the vehicle's lights and honk its horn to alert the service delivery person directly to the target vehicle's location (see, for example, FIG. 7A), in order to save time and aid in locating the target vehicle within rows of parked cars. Alternatively, the request can be initiated by the client device of the service vehicle or the client device of the service delivery person. This ensures the designated target vehicle is identified properly and increases efficiency of delivering the service.

(10) The cloud based system of on-site vehicle maintenance service verifies the request and blinks the hazard lights and/or unlocks the target vehicle.

As discussed, before sending the functional commands including lock/unlock doors, give an alert, and turn engine on/off to the target vehicle of the customer, the security module in the first server associated with the on-site vehicle maintenance service receives at least two virtual verification keys, a first virtual verification key from the client device associated with the service vehicle and a second virtual verification key from the client device associated with the customer. The first virtual verification key can be given a first shelf life and the second virtual verification key can be given a second shelf life such that sending of the functional commands stay within an overlap window of time between the first shelf life and the second shelf life.

Optionally, the GPS based proximity module waits for a confirmation from the delivery application that the service delivery person has located the target vehicle. Then the GPS based proximity module composes a correct request command and sends the request via the one or more application programming interfaces to the dongle module in the vehicle to open the trunk of the vehicle or some other electro-mechanical actuation of a window, sunroof, or turn on/off an engine of the vehicle.

(11) After unlocking the target vehicle, the service delivery person performs the vehicle maintenance and service jobs and the delivery person informs the cloud based system of on-site vehicle maintenance service about the completion of the vehicle maintenance and service jobs via the delivery application on the client's device to the cloud based system of on-site vehicle maintenance service.

(12) The service delivery person optionally sends confirmation to the maintenance and service provider. Alternatively, the delivery application on the client's device can be configured to monitor for the confirmation sent to the cloud based system of on-site vehicle maintenance service to automatically send the completion confirmation to the maintenance and service provider.

(13) After (11), the cloud based system of on-site vehicle maintenance service polls the lock status of the vehicle. In fact, after receiving a confirmation of the completion of vehicle maintenance and service jobs from the service delivery application in the service delivery person's client device, the GPS-based proximity module in the cloud based system of on-site vehicle maintenance service can receive GPS coordinates from the service delivery application in the service delivery person's client device and resume monitoring the service vehicle. The GPS based proximity module performs distance monitoring to recognize when the service delivery person is departing and then is scripted to verify that the target vehicle is locked and to avoid the service delivery person leaving an unlocked vehicle. The cloud based system of on-site vehicle maintenance service polls the lock status of the target vehicle by sending a request to the dongle module.

(14) Dongle module responds with the lock door status (open/closed). If door lock status is not confirmed, the GPS-based proximity module in the cloud based system of on-site vehicle maintenance service sends a request via the one or more application programming interfaces to the dongle module in the vehicle to close and lock the vehicle's doors/trunk. This feature improves security to insure the vehicle is locked after departure and is not left unlocked. Additionally, the lock check can include a check that the target vehicle's engine is turned off.

Note, the GPS proximity module is scripted to perform multiple actions including i) waking up a vehicle via its associated dongle module, ii) facilitating for the electro mechanical operations in the vehicle to occur, such as unlocking/locking doors, opening/closing windows, opening and unlocking/closing and locking a trunk, opening/closing sunroof, turning engine on/off, and iii) detecting when the service vehicle is at a certain distance away from the target vehicle, then the vehicle should be secure at that point.

Figure 12:
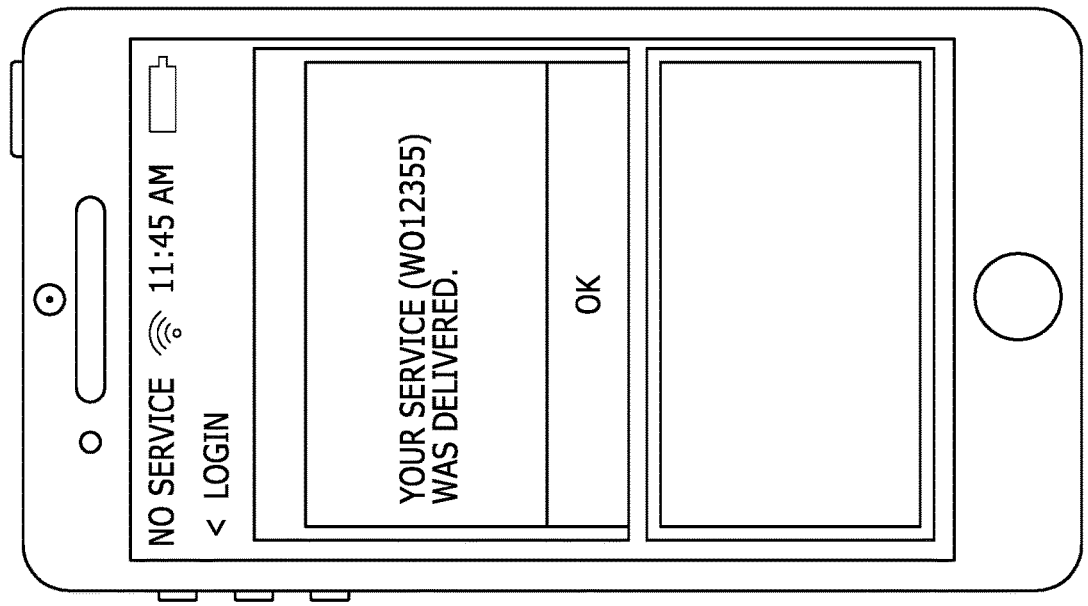
FIG. 12 illustrates the on-site vehicle maintenance service messages received on the client device of the customer.
Figure 12:
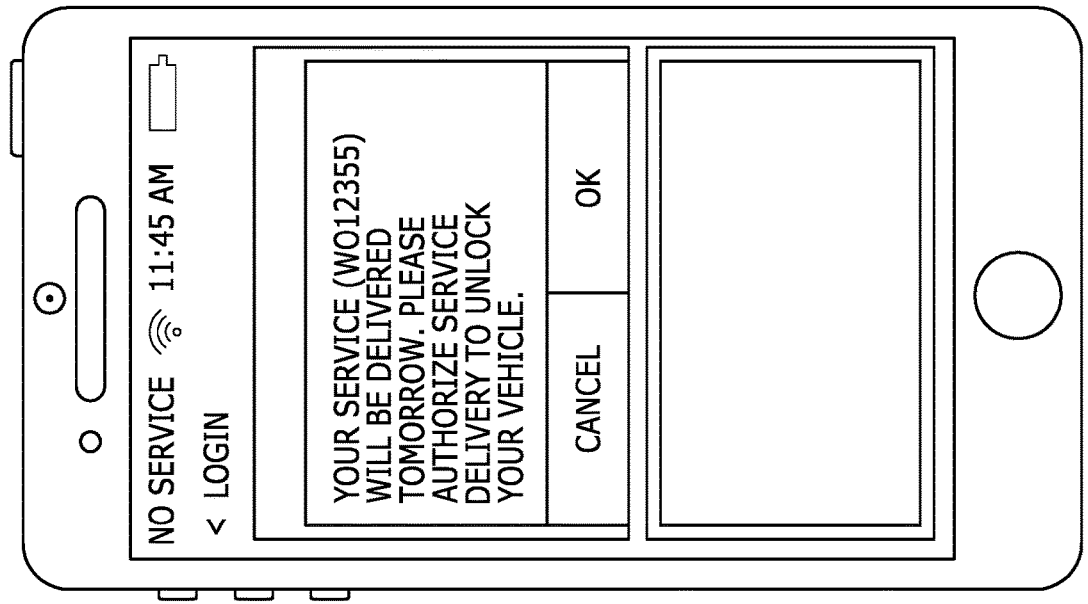

(15) The cloud based system of on-site vehicle maintenance service sends a delivery confirmation notice to the User on either the mobile application or the desktop application on their client device (see, for example, FIG. 12).

(16) The maintenance and service provider sends delivery confirmation email to User.

The onboard actuation module in the target vehicle of the customer can be a dongle module having a Wi-Fi or cellular communication circuit configured to establish a secure communication with the GPS-based proximity module of the first server of the cloud based provider site. The dongle module can be coupled to a fault and diagnostic module installed in the target vehicle of the customer to retrieve diagnostic data including the current GPS coordinates of the target vehicle of the customer. The dongle module can be configured to send the current GPS coordinates of the target vehicle of the customer to the GPS-based proximity module of the first server of the cloud based provider site. Likewise, the dongle module can be configured to send the current GPS coordinates of the target vehicle of the customer to a client device of the customer. As an example, when the target vehicle of the customer is parked in a location that Wi-Fi or cellular communication cannot be established between the dongle module and the GPS-based proximity module of the first server associated with the on-site vehicle maintenance service, the user/customer can receive the GPS coordinated of the target vehicle on his client device and later can send the GPS coordinates of the target vehicle to the first server associated with the on-site vehicle maintenance service.

Also, the onboard dongle module in the target vehicle of the customer can be configured to communicate with the security module of the first server associated with the on-site vehicle maintenance service through the Wi-Fi or cellular communications to receive the functional commands including lock/unlock doors, give an alert, and turn engine on/off. The dongle module can include an RF circuitry of a key fob and can be configured to perform the functional commands by transmitting RF signals that include the functional commands to a Body Control Module of the target vehicle of the customer.

In an example, the dongle module has a circuitry including the RF circuitry of a key fob and additionally is capable of executing an algorithm to generate rolling security keys of the Body Control Module. The dongle module can be taught as an extra key fob. The teaching of the dongle module as an extra key fob can be automated and performed by receiving commands via Wi-Fi or cellular communications from the security module of the first server associated with the on-site vehicle maintenance service. After being taught, the current rolling security key can be stored in the dongle module. Upon receiving the functional commands the dongle module can generate the next rolling security key based on the current rolling security key to be transmitted along with the functional commands to the Body Control Module.

In another example, the dongle module has a circuitry including the RF circuitry of a key fob and additionally is capable of executing an algorithm to generate rolling security keys of the Body Control Module. The dongle module can be taught as an extra key fob. The teaching of the dongle module as an extra key fob can be automated and performed by receiving commands via Wi-Fi or cellular communications from the security module of the first server associated with the on-site vehicle maintenance service. After being taught, the current rolling security key may not be stored in the dongle module and is transmitted to be stored in a database associated with the security module of the first server associated with the on-site vehicle maintenance service. The security module of the first server associated with the on-site vehicle maintenance service sends the functional command and the stored rolling security key to the dongle module. Upon receiving the functional commands and the rolling security key, the dongle module generates the next rolling security key based on the current rolling security key to be transmitted along with the functional commands to the Body Control Module.

In another example, the dongle module has the RF circuitry of a key fob but is not capable of executing an algorithm to generate rolling security keys of the Body Control Module. The security module of the first server associated with the on-site vehicle maintenance service is capable of executing an algorithm to generate rolling security keys of the Body Control Module. The dongle module and the security module of the first server associated with the on-site vehicle maintenance service can jointly be taught as an extra key fob. The teaching as an extra key fob can be automated and performed by sending commands and rolling security keys via Wi-Fi or cellular communications from the security module of the first server associated with the on-site vehicle maintenance service to the dongle module to be transmitted by the dongle module to the Body Control Module. After being taught, a characteristic-data of the key fob including a serial number, seed, and pointer to current rolling sequence is transferred to the first server associated with the on-site vehicle maintenance service. Then the security module of the first server associated with the on-site vehicle maintenance service executes the algorithm of the pseudo-random number generator to generate rolling security keys of the Body Control Module based on the characteristic-data and thus generates the next rolling security key and sends it along with the functional commands to the dongle module to be transmitted to the Body Control Module.

The second virtual verification key is received from the client device associated with the customer. The second virtual key can be a rolling security key of a Body Control Module (BCM) of the target vehicle of the customer. The rolling security key is used by the security module of the first server associated with the on-site vehicle maintenance service to generate a next rolling security key for the Body Control Module of the target vehicle of the customer. The next rolling security key can be sent through the Wi-Fi or cellular communications to the onboard dongle module in the target vehicle of the customer. The onboard dongle module in the target vehicle of the customer can transmit the next rolling security key along with the functional commands to the Body Control Module of the target vehicle of the customer. The Body Control Module of the target vehicle of the customer can use the next rolling security key to authenticate the received commands including lock/unlock doors, give an alert, and turn engine on/off.

The dongle module can be coupled to cooperate with a fault and diagnostic module installed in the target vehicle of the customer to retrieve diagnostic data including the GPS coordinates of the vehicle of the user. Additionally the dongle module solution can include RF circuitry and to operate like a key fob and to access Body Control Module (BCM) of the target vehicle of the customer. Most of the transactions are protected by HTTPS protocol (public-private key pairs and certificate). A security mechanism such as HTTPS protocol is supported by all popular web frameworks. The whole system has several cyber security mechanisms: i) the server associated with the on-site vehicle maintenance service needs to apply for a certificate from one of the trusted CAs, ii) the service delivery person needs to register for verification, and iii) the User needs to register with the cloud based system of on-site vehicle maintenance service to use the service to verifying the vehicle type is supported by having a dongle module installed in the vehicle.

A customer's key fob can have a module such as a chip with a memory to receive GPS signals and calculate GPS coordinates. An application on a customer's smart phone can either use Bluetooth to obtain the vehicle's GPS coordinates from a navigation module (e.g. a dongle) in the vehicle or from the module in the key fob. The GPS coordinates can be stored in the key fob each time the target vehicle's ignition is turned off or when the key fob is used to lock the vehicle. Each time the user's key fob is used to either turn off the engine or to lock the target vehicle, the GPS coordinates of the key fob is calculated and stored in the key fob. The user's key fob is also configure to use wireless communication such as peer-to-peer Bluetooth communication to transfer the stored data in the key fob to another device in its vicinity implementing the same protocol. As an example, Bluetooth communication can be used for transferring the GPS coordinates of the user's key fob to a user's/customer's client device, where the user can later upload the GPS coordinates to the the cloud based system of on-site vehicle maintenance service. In an example, the GPS coordinates are automatically uploaded upon being received from the customer's key fob.

In an embodiment, the customer's key fob may not receive the GPS signals or may not calculate the GPS coordinates but may receive and store the GPS coordinates from a GPS calculating module (e.g., a dongle module or a telematics module) inside the target vehicle. As an example, when the target vehicle is turned off or locked, the GPS coordinates of the target vehicle are transmitted via for example Bluetooth communications from the target vehicle to the user's key fob.

In an embodiment, the mobile application of the client device of the customer can be used for obtaining the GPS coordinates. For example, when the car is turned off or when it is locked, the user's key fob can use for example Bluetooth communications for communicating with the mobile application of the client device of the user/customer and instruct it to obtain the GPS coordinates and send them to the cloud based system of on-site vehicle maintenance service.

The customer's/user's key fob and the Body Control Module of the user's vehicle cooperate based on a same algorithm in the pseudo-random number generator for that type of vehicle and seed for creating the rolling security keys. The Body Control Module of the user's car uses the algorithm, seed, and current rolling security key to generate the next rolling security key. Each time a lock/unlock button on user's key fob is pushed a new rolling security key is generated and transmitted to the user's car. If the Body Control Module of the user's vehicle receives the expected rolling security key, it accepts and executes the commands such as lock/unlock. Both, the user's car and the user's key fob implement the same algorithm with the same seed; and thus, based on the same current rolling security key, they generate the same next rolling security key. Therefore, assuming the user's key fob and the Body Control Module of the user's vehicle are in synch, i.e., use the same existing rolling security key to generate the next rolling security key, the Body Control Module expects the same next rolling security key that user's fob transmits and thus executes the user's commands. The user's key fob is configured such that each time a button on the user's key fob such as lock/unlock is pushed the rolling security key is stored in the key fob. The stored rolling security key can be transferred to another device in the same way GPS coordinates are transferred. In an example, the rolling security key is encrypted.

Thus as discussed, user's key fob is configured with wireless communication functionality such as Bluetooth communication to transmit both the GPS coordinates and the rolling security key to a customer's/user's client device. The transmitted data can be encrypted. A downloadable mobile application from the cloud based system of on-site vehicle maintenance service resident on the client device of a user/customer, or a web-browser application from the cloud based system of on-site vehicle maintenance service resident on the client device of the user can implement the Bluetooth protocols to receive the GPS coordinates and the rolling security key from the user's key fob.

The client device associated with the service vehicle can be configured to communicate with the security module of the first server associated with the on-site vehicle maintenance service through the Wi-Fi or cellular communications to receive the functional commands including lock/unlock doors, give an alert, and turn engine on/off. The client device of the service vehicle can be coupled to an RF circuitry of a key fob and can be configured to perform the functional commands by transmitting RF signals that include the functional commands to a Body Control Module of the target vehicle of the customer.

The GPS-based proximity module of the first server associated with the on-site vehicle maintenance service can be configured to receive the current GPS coordinates of the target vehicle of the customer from a client device of the customer through a Wi-Fi or cellular communications.

Alternatively, the next rolling security key can be sent to the client device associated with the service vehicle and to be used by a maintenance person of the service vehicle for sending the functional commands to the Body Control Module of the target vehicle of the customer. The client device associated with the service vehicle can be configured to act as a universal key fob simulator for transmitting RF signals that include the functional commands along with the next rolling security key to the Body Control Module of the target vehicle of the customer. The Body Control Module of the target vehicle of the customer can use the next rolling security key to authenticate the received commands including lock/unlock doors, give an alert, and turn engine on/off.

High Level Description of Each Transaction in Case of Telematics Solution

Figure 3A:
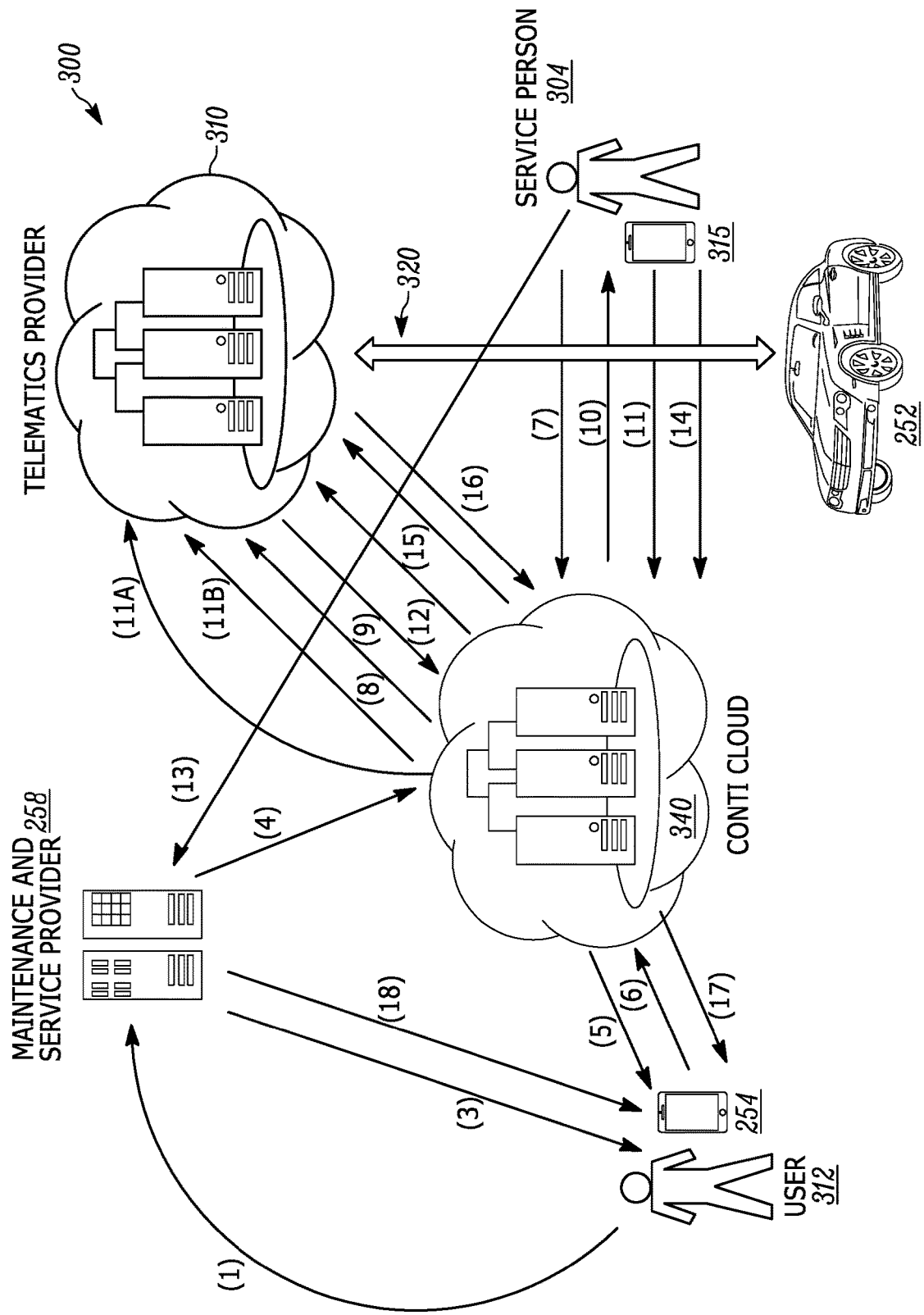
FIGS. 3A-3C illustrate block and flow diagrams of an embodiment of the alternative service delivery system using a telematics solution.
Figure 3B:
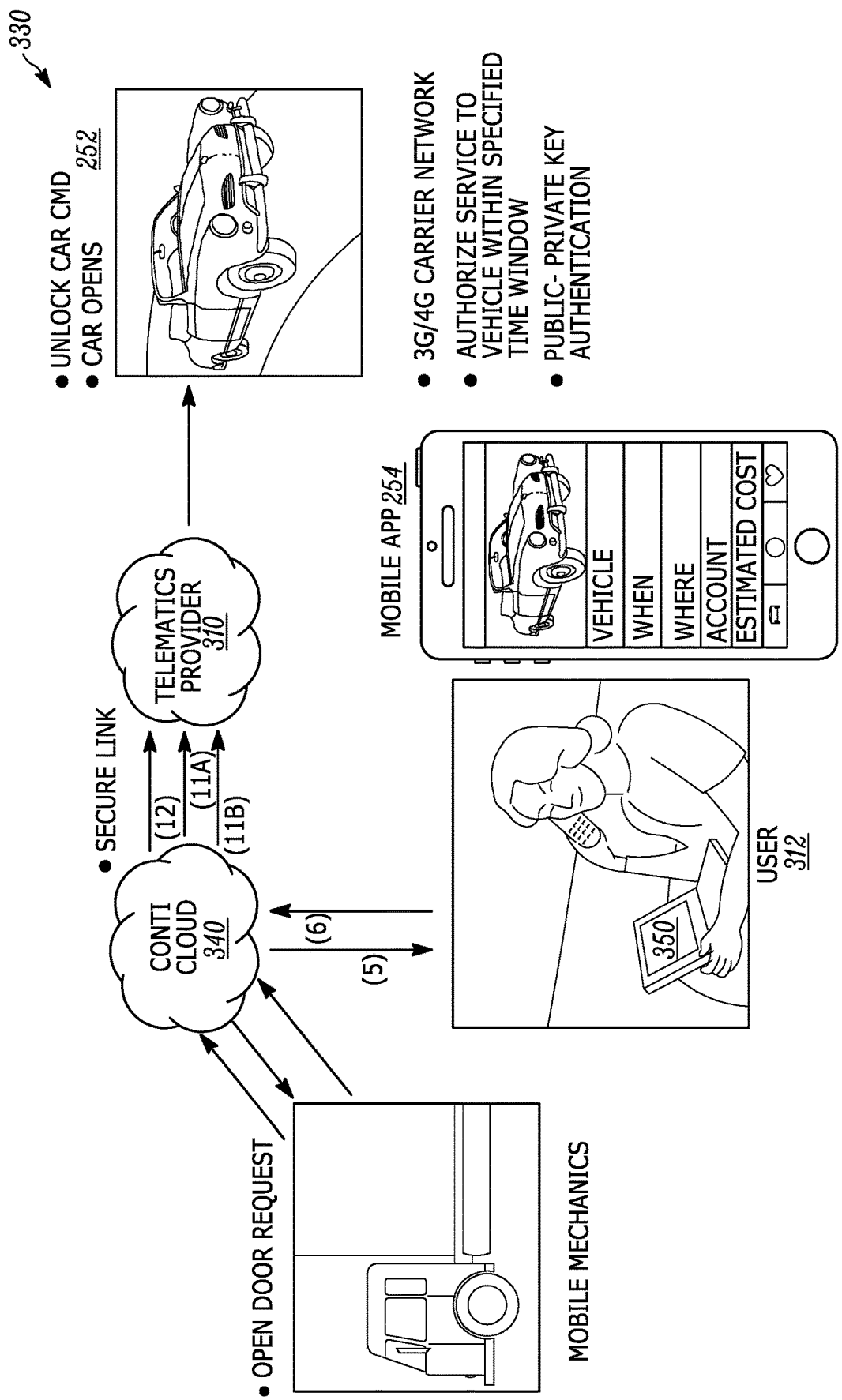
Figure 3C:
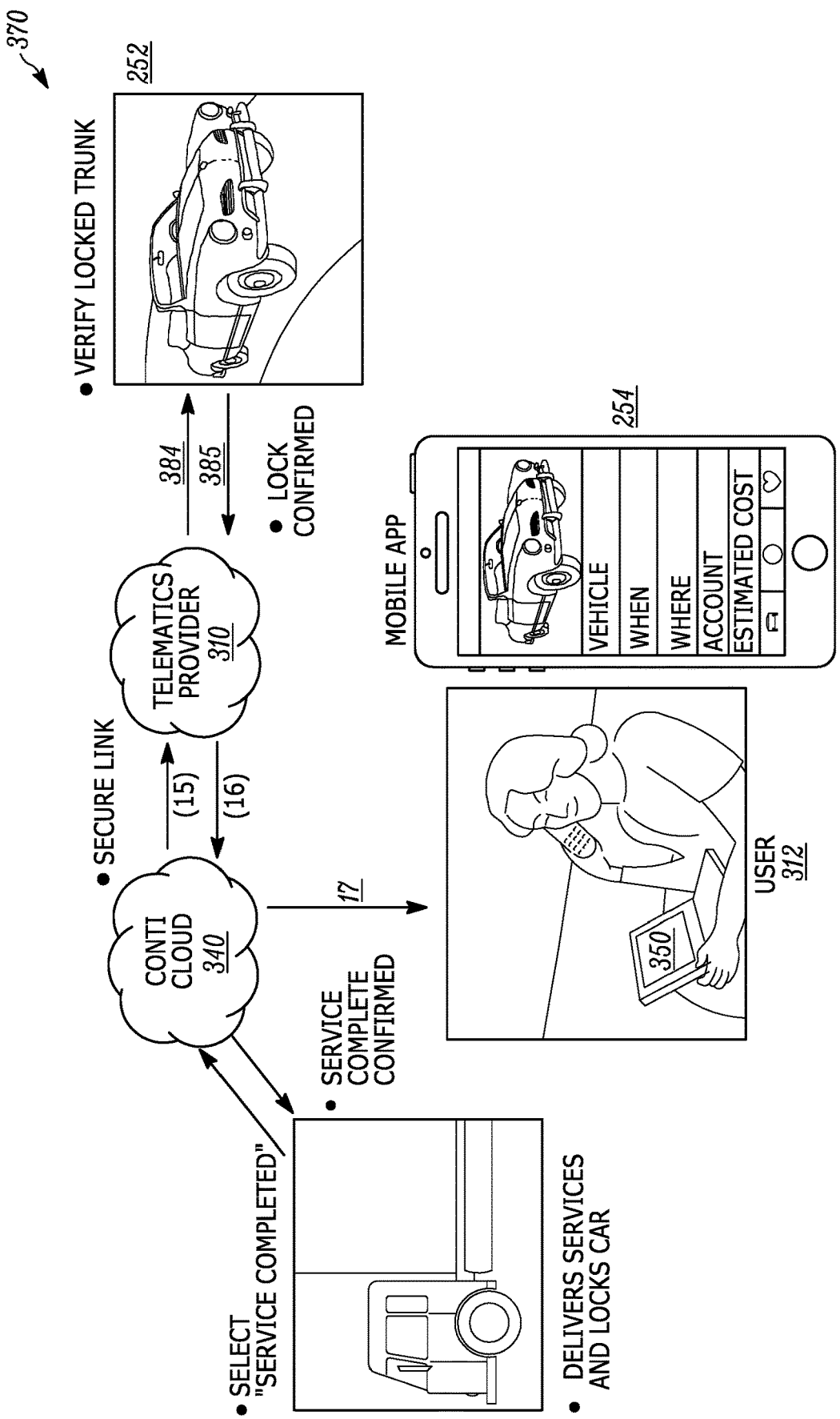

FIGS. 3A-3C illustrate block and flow diagrams of embodiments of the alternative on-demand mobile vehicle maintenance services using a telematics solution. Note, an example telematics solution is discussed below. However, similar principles can be applied in solutions merely using on-site vehicle maintenance services without integrating the telematics solution into the design. The on-site vehicle maintenance services may schedule an on-site vehicle maintenance service at the vehicle owner's home, work, or anywhere. The on-site vehicle maintenance service site may present a user interface to schedule an appointment and/or the vehicle maintenance service site may present a user interface to schedule an appointment. The backend server and database confirms with the vehicle owner that they have requested on-site vehicle maintenance service. The backend server and database may then use the GPS tracking and electro-mechanical actuation of the target vehicle discussed below to service that vehicle.

An alternative vehicle maintenance system is discussed. The system includes a cloud-based on-site vehicle maintenance service that is hosted on a cloud-based provider site, one or more maintenance and service providers, having both a service website as well as one or more service vehicles with client devices having a delivery application resident in each client device, and one or more OEM 'remote access/connectivity' systems that are configured to have communications between the cloud and a vehicle in order to exchange information including GPS coordinates of the vehicle and interact with the vehicle's on-board intelligence system, such as an on-board telematics module, to cause electromechanical actions within that vehicle including: unlocking doors, opening windows, opening trunks, closing trunks, turning engine on, turning engine off, opening and closing a sunroof or moon roof. Thus, the on-board intelligence system may cause the opening & closing of those mechanical portions of the car/vehicle. The cloud-based on-site vehicle maintenance service has one or more open application programming interfaces to standardly exchange information between the two or more maintenance and service providers and/or the two or more OEM 'remote access/connectivity' systems such as an OEM telematics system. (See FIG. 5 for an example class diagram of an embodiment of an application programming interface for the alternative vehicle maintenance system.) The telematics systems are configured to have wireless communications between a server in the cloud and a given vehicle. A hardware module, such as a telematics module, in the vehicle then causes electromechanical actions within that given vehicle in order to allow the cloud-based on-site vehicle maintenance service to access a plurality of different kinds of vehicles, manufactured from a number of different manufactures. An example telematics module may cooperate with or be part of a navigation system in the vehicle. The cloud-based on-site vehicle maintenance service has a communication module scripted to establish a communication link with a communication terminal of either or both of the telematics systems or the maintenance and service provider sites via a communication network. The OEM 'remote access/connectivity' systems can include manufactures, such as Tesla Motors, who have backend servers that directly communicate with a telematics module in the vehicle.

FIG. 3A illustrates an example sequence of steps.

(0) Steps 1-7 are the same as the previous solution.

(1) The User uses either a mobile application on their client device or accesses a maintenance and service provider website via a browser on their client device (see, for example, FIG. 11). The maintenance and service provider website collects order information including the "in the field" maintenance orders selected. The client device submits order and vehicle information via the mobile application to the maintenance and service provider website, in the case of service delivering to a vehicle, the information includes the vehicle VIN.

The maintenance and service provider website can supply a checkbox or button on its website such that by selecting the checkbox or button, the existence of a valid account on the cloud based system of on-site vehicle maintenance service and validity of user credentials for "in the field" service delivery may be verified. The verification can include one of 1) the maintenance and service provider website acquires the customer credentials and sends the customer credentials to the cloud based system of on-site vehicle maintenance service for verification, or 2) redirecting the customer to a login screen on the website of the cloud based system of on-site vehicle maintenance service such that the customer can enter the credentials. In either case, if the customer credentials are valid, the cloud based system of on-site vehicle maintenance service may verify the customer. Alternatively, if the customer does not have an account, the customer may register on the cloud based system of on-site vehicle maintenance service website and create an account. The customer credentials can include a username and a password and zero or more security questions.

As described, the maintenance and service provider website can supply a checkbox or button on its website such that by selecting the checkbox or button, the existence of a valid account on the cloud based system of on-site vehicle maintenance service and validity of user credentials for "in the field" service delivery may be verified.

(3) The maintenance and service provider sends confirmation including Work Order Number to the User on their client device.

(4) The maintenance and service provider sends a notification to the cloud based system of on-site vehicle maintenance service, including Work Order Number and VIN.

(5) The cloud based system of on-site vehicle maintenance service sends a first notification to either the mobile application or the desktop application on their client device and confirms with the User their desire to have a maintenance and service job to their vehicle with the Work Order Number and VIN for the service delivery (see, for example, FIG. 12).

(6) After the first notification, the User can supply a response into either the mobile application or the desktop application on their client device to send permission (User name and Password) for the telematics system, such as OnStar, to the cloud based system of on-site vehicle maintenance service. In response to the second notification, the user may supply a second confirmation including a security token of the vehicle. As discussed, the cloud based system of on-site vehicle maintenance service has a multiple step, such as a two-phase, verification mechanism involving two security keys. (See FIGS. 8A-8D on block diagrams of embodiments of the multiple paired virtual keys and security authorization notices used by the on-site vehicle maintenance service.)

As described, the first virtual key is provided by the cloud based system of on-site vehicle maintenance service using a secure communication to the maintenance and service provider. The maintenance and service provider can supply the first key to a client device in the service vehicle or to a client device of the service delivery person. The first key can be used by the cloud based system of on-site vehicle maintenance service to validate commands/request/data received from maintenance and service provider, service vehicle, or a client device associated with the delivery person when the received command/request/includes the first virtual key.

(7) After the service vehicle arrives at the same city, the service delivery person can use an application in their client device to send the Work Order Number to the cloud based system of on-site vehicle maintenance service in order to obtain the vehicle's information including its current location information.

Figure 7B:
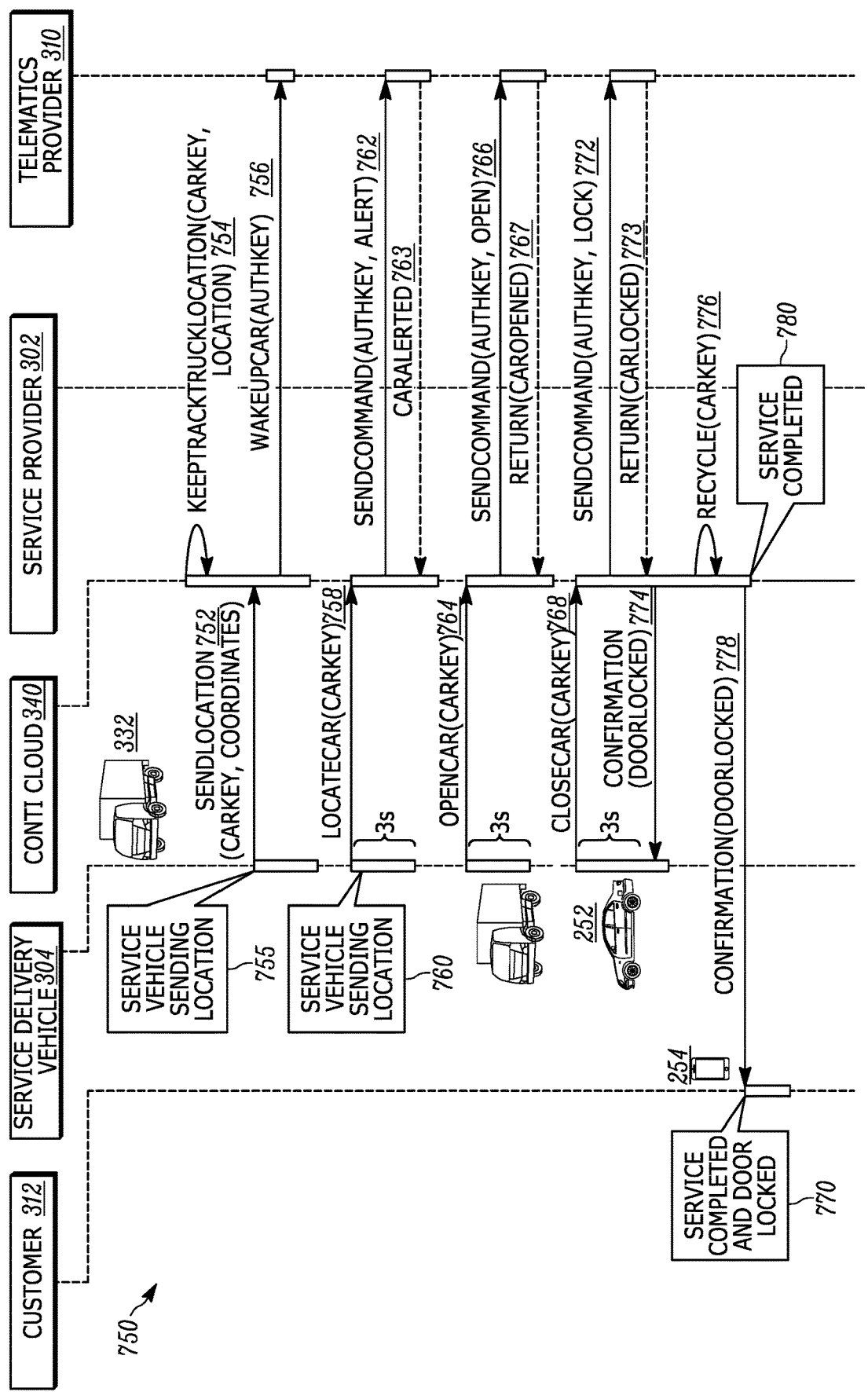
Figure 8A:
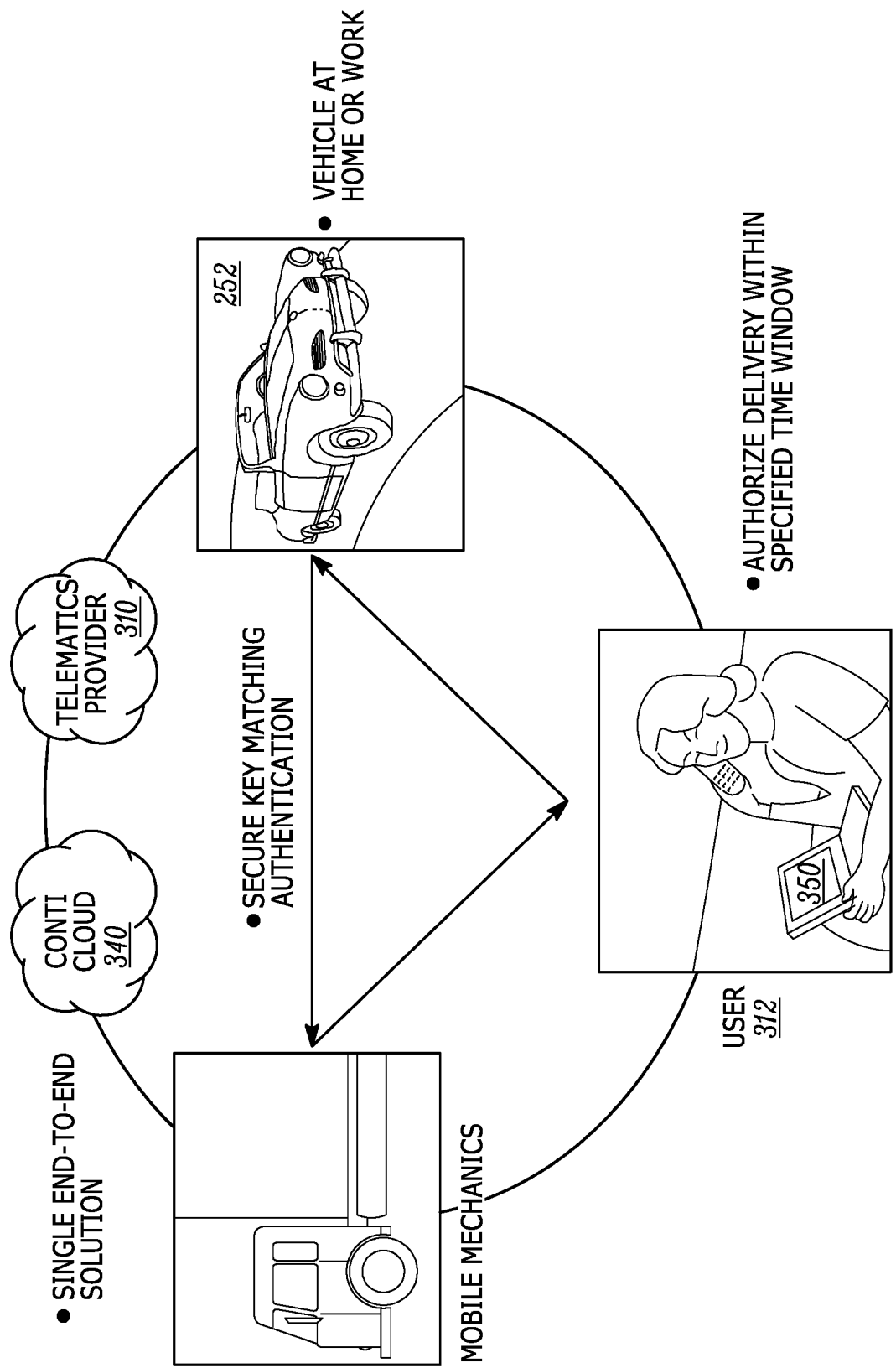
FIGS. 8A-8D illustrate block diagrams of embodiments of the multiple paired virtual keys and security authorization notices used by the on-site vehicle maintenance service.
Figure 8B:
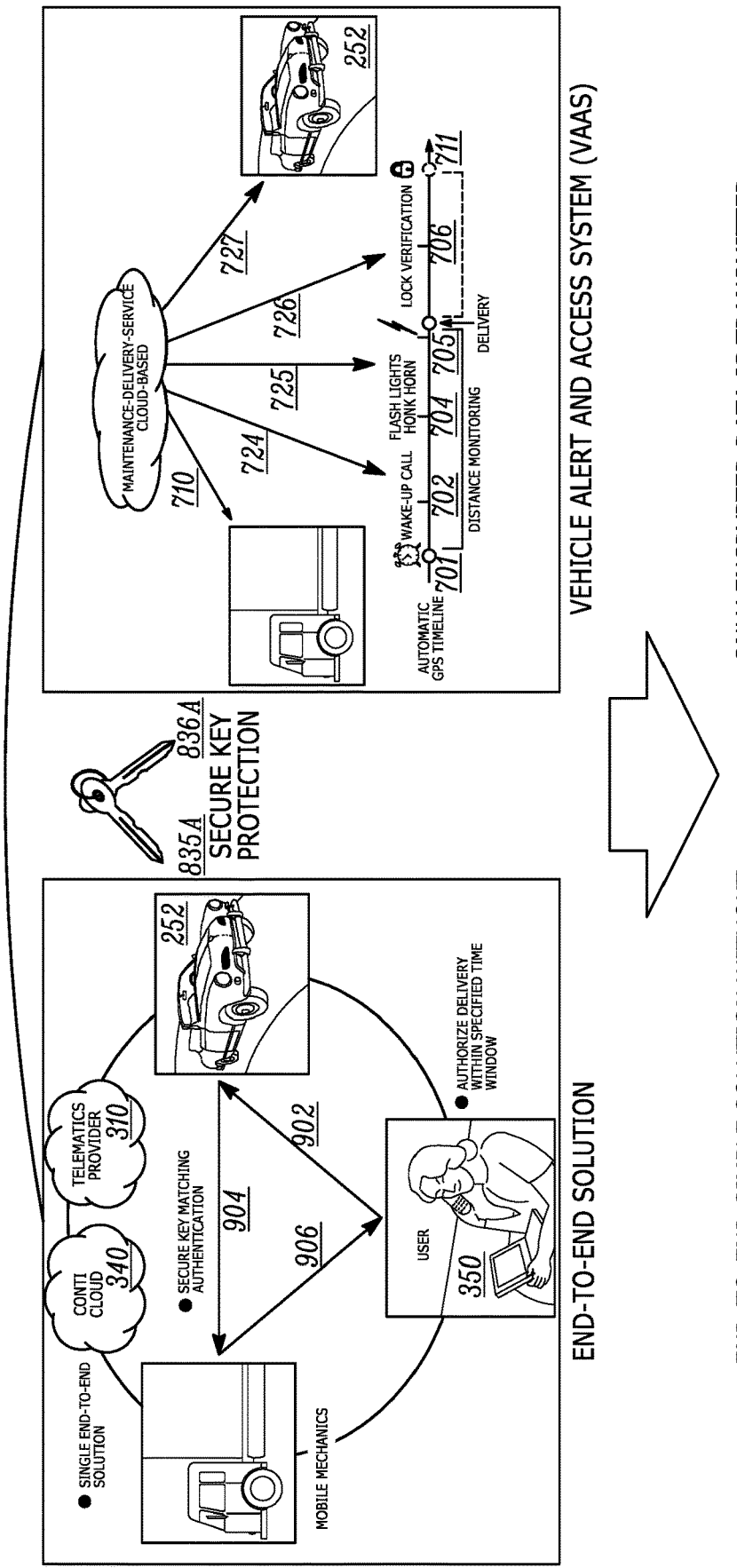
Figure 8C:
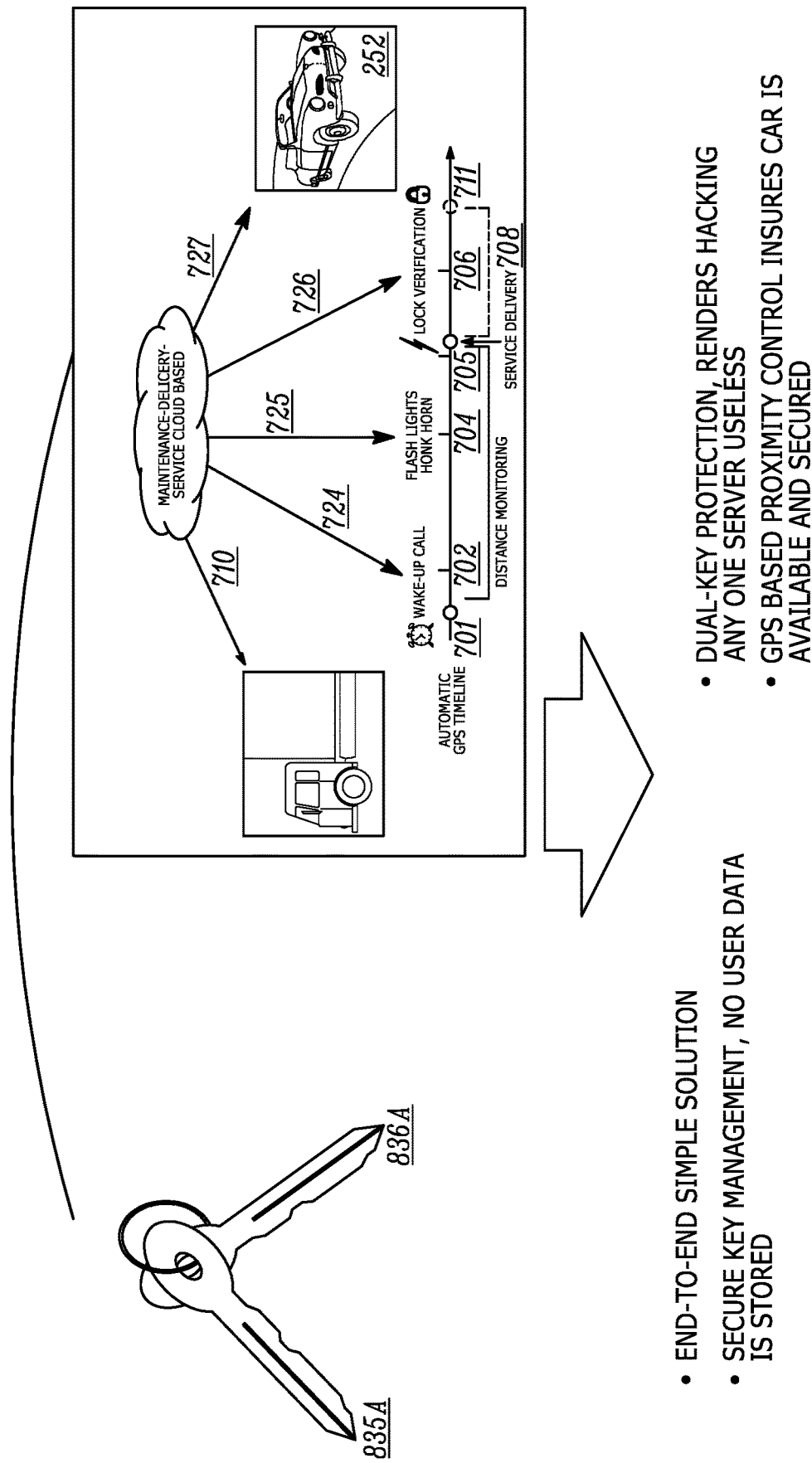
Figure 8D:
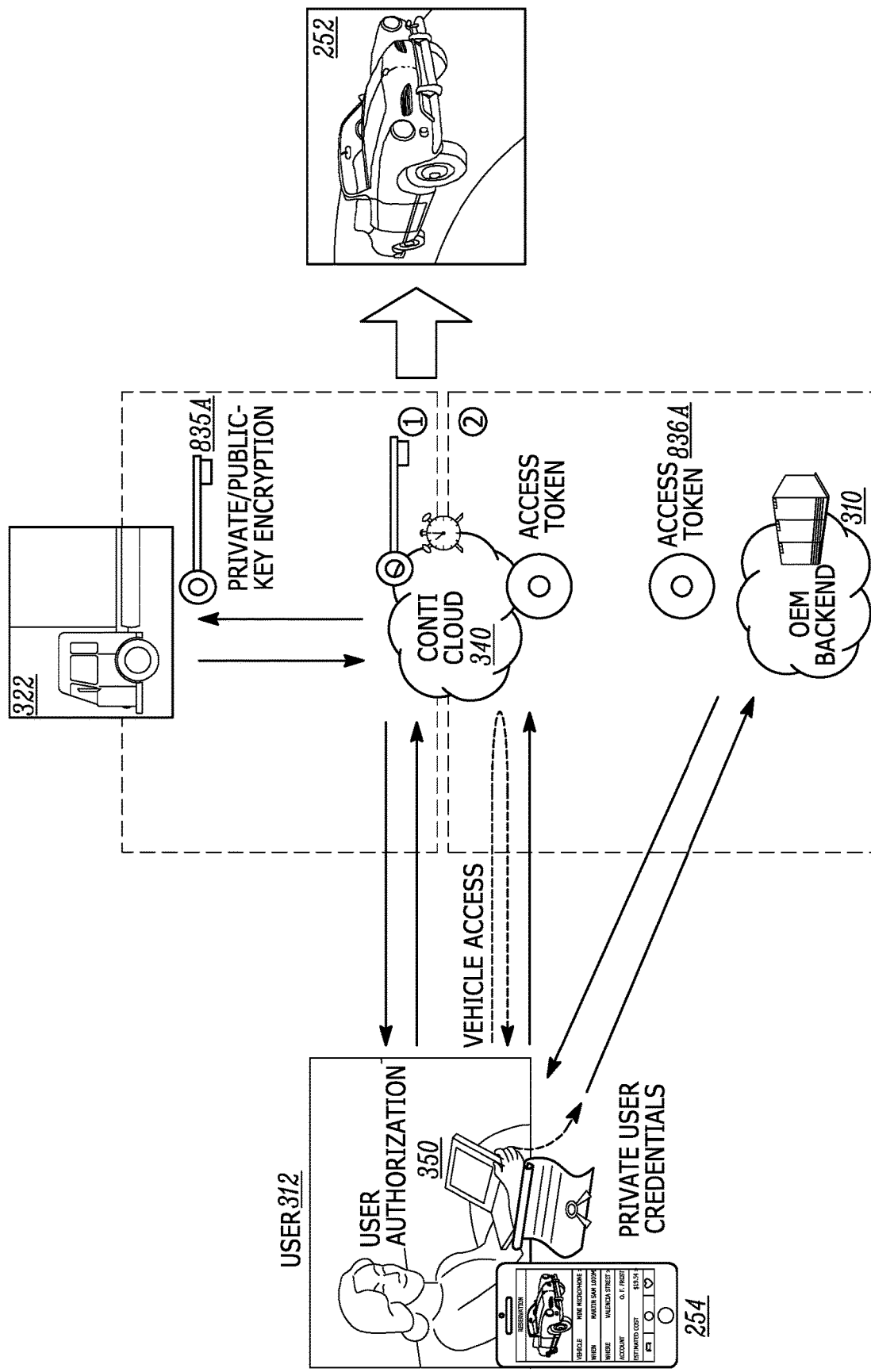

(8) The cloud based system of on-site vehicle maintenance service sends a request via the one or more open application programming interfaces to the OEM backend of the telematics entity system for the vehicle's current GPS location information using its VIN. (See FIGS. 7A and 7B on embodiments of the GPS-based control and tracking mechanisms used for service delivery to the vehicle.)

(9) The telematics system OEM backend site communicates with the target vehicle's navigation system and sends back the vehicle location information from the vehicle's navigation system via the one or more open application programming interfaces to the cloud based system of on-site vehicle maintenance service. The cloud based system of on-site vehicle maintenance service stores this information in its database.

(10) The cloud based system of on-site vehicle maintenance service responds to the service delivery application in the client device of the service delivery person with the vehicle's location information.

(11) Upon approaching the target vehicle, a service delivery application in the client device of the service delivery person can send a request to the cloud based system of on-site vehicle maintenance service to wake up the target vehicle by either automatically detecting a close proximity by the first threshold distance between the service vehicle and the target vehicle or can be prompted by the service delivery person to send the request. The vehicle's telematics module may be in a sleep-mode as this prevents battery drain when vehicle is not in use and thus the vehicle's telematics module needs to be sent a wake up notice. The cloud based system of on-site vehicle maintenance service via the one or more application programming interfaces sends one or more wake up requests to the telematics system OEM Backend in order for the telematics system OEM Backend to wake up the vehicle. In an embodiment, the wake up message can be initiated either manually by the service delivery person, or automatically by the GPS based proximity module in the cloud based system of on-site vehicle maintenance service.

(11A) The GPS based proximity module in the cloud based system of on-site vehicle maintenance service via the one or more application programming interfaces sends one or more wake up requests to the telematics system OEM Backend to wake up the target vehicle as the service vehicle arrives near the target vehicle. However, without the advanced sequence of wake up requests, the target vehicle's telematics control may be in sleep mode and a service delivery person might be forced to wait 10 minutes or more to unlock the door. In order to prevent a delay due to in-vehicle power saving mode, the vehicle's telematics module is sent a command (e.g., send your GPS coordinates) to execute the command before the service delivery truck arrives at the location of the target vehicle to keep the target vehicle awake so that the target vehicle respond immediately to a command to unlock the door (see, for example, FIG. 7A).

(11B) A GPS-based proximity module in the cloud based system of on-site vehicle maintenance service will also send a request via the one or more application programming interfaces to the telematics system OEM Backend to send a command to cause a localized alert in the target vehicle so that the vehicle can blink the vehicle's lights and honk its horn to alert the service delivery person directly to the target vehicle's location (see, for example, FIGS. 7A and 7B), in order to save time and aid in locating the target vehicle within rows of parked cars.

As discussed, before sending the functional commands including lock/unlock doors, give an alert, and turn engine on/off to the target vehicle of the customer, the security module in the first server associated with the on-site vehicle maintenance service receives at least two virtual verification keys, a first virtual verification key from the client device associated with the service vehicle and a second virtual verification key from the client device associated with the customer. The first virtual verification key can be given a first shelf life and the second virtual verification key can be given a second shelf life such that sending of the functional commands stay within an overlap window of time between the first shelf life and the second shelf life.

(12) Optionally, the GPS based proximity module waits for a confirmation from the delivery application that the service delivery person has located the target vehicle. Then the GPS based proximity module composes a correct request command and sends the request via the one or more application programming interfaces to the telematics system OEM Backend to send a command to the intelligent vehicle's telematics module in the vehicle to open the trunk of the vehicle or some other electro-mechanical actuation of a window, sunroof, or turn on/off an engine of the vehicle.

(13) Upon unlocking the target vehicle, the service delivery person performs the vehicle maintenance and service jobs. Optionally, the service delivery person can inform the maintenance and service provider about the progress and/or completion of the vehicle maintenance and service jobs.

(14) The service delivery person sends confirmation of the completion of vehicle maintenance and service jobs and the securing of the target vehicle via the delivery application on the client's device to the cloud based system of on-site vehicle maintenance service. Alternatively, the delivery application on the client's device can be configured to monitor for the confirmation sent by the service delivery person to the maintenance and service provider to automatically send the completion confirmation to the cloud based system of on-site vehicle maintenance service.

(15) After receiving a confirmation of the completion of vehicle maintenance and service jobs from the service delivery application in the service delivery person's client device, the GPS-based proximity module in the cloud based system of on-site vehicle maintenance service can receive GPS coordinates from the service delivery application in the service delivery person's client device and resume monitoring the service vehicle. The GPS based proximity module performs distance monitoring to recognize when the service delivery person is departing and then is scripted to verify that the target vehicle is locked and to avoid the service delivery person leaving an unlocked vehicle. The cloud based system of on-site vehicle maintenance service checks the lock status of the target vehicle by sending a request to the telematics system's OEM backend.

(16) As described above, the GPS based proximity module in the cloud based system of on-site vehicle maintenance service sends a request via the one or more application programming interfaces to the telematics system OEM Backend to send a command to the intelligent telematics module in the vehicle to check the lock status and to confirm the vehicle's doors/trunk is both closed and locked. The telematics system's OEM backend also responds back to the cloud based system of on-site vehicle maintenance service with a lock confirmation that the vehicle's doors/trunk is both closed and locked, or does not confirm lock status. If not confirming, the GPS-based proximity module in the cloud based system of on-site vehicle maintenance service sends a request via the one or more application programming interfaces to the telematics system OEM backend to send a command to the intelligent vehicle's telematics module in the vehicle to close and lock the vehicle's doors/trunk. This feature improves security to insure the vehicle is locked after departure and is not left unlocked. Additionally, the lock check can include a check that the target vehicle's engine is turned off.

(17) The cloud based system of on-site vehicle maintenance service sends delivery confirmation to the User on either the mobile application or the desktop application on their client device (see, for example, FIG. 12).

(18) The maintenance and service provider sends delivery notice email to the User.

A cloud based system for vehicle maintenance to a target vehicle includes a cloud based on-site vehicle maintenance service hosted a cloud based provider site that includes one or more servers each having one or more processors. The servers are configured to communicate with one or more databases in the cloud based provider site.

A cloud based system for vehicle maintenance to a target vehicle includes a GPS-based proximity module in a first server associated with the on-site vehicle maintenance service. The GPS-based proximity module is configured to receive both current GPS coordinates of a service vehicle associated with a first maintenance and service provider and current GPS coordinates of the target vehicle of a customer for at least one vehicle maintenance and service operation to the target vehicle of the customer. Both GPS coordinates are stored both in a first database of the cloud based provider site. The GPS-based proximity module is configured to monitor a distance between the service vehicle and the target vehicle of the customer. The distance can be calculated from the GPS coordinates.

Also, the cloud based system for vehicle maintenance to a target vehicle includes a security module in the first server associated with the on-site vehicle maintenance service. The security module is configured to setup at least one vehicle maintenance and service operation including 1) directing the service vehicle to the target vehicle of the customer, 2) opening and/or unlocking the target vehicle of the customer to ensure one or more vehicle maintenance and service jobs can be performed on the target vehicle of the customer, and 3) ensuring the one or more vehicle maintenance and service jobs have been performed. Also after performing the vehicle maintenance and service jobs, the security module ensures the target vehicle of the customer is closed and locked and the vehicle maintenance and service jobs are complete. Additionally, after performing the vehicle maintenance and service jobs, the security module can check that the target vehicle's engine is off.

Additionally, the security module in cooperation with the GPS-based proximity module is further configured to send to the target vehicle of the customer one or more functional commands. The functional command include 1) to wake-up an on-board actuation module in the target vehicle of the customer while in a close proximity established by a first threshold distance between the service vehicle and the target vehicle of the customer, 2) to give an alert from the target vehicle of the customer while in a close proximity established by a second threshold distance between the service vehicle and the target vehicle of the customer, 3) to unlock a door of the target vehicle of the customer, 4) to turn on or off an engine of the target vehicle of the customer, and 5) to lock the doors of the target vehicle of the customer. The doors of the target vehicle of the custom may be locked after i) verifying the engine of the target vehicle of the customer is turned off and ii) receiving a confirmation of a completion of the vehicle maintenance and service operation from the service vehicle.

The onboard actuation module in the target vehicle of the customer can be an onboard telematics module installed in the target vehicle of the customer and configured to communicate with the GPS-based proximity module of the first server associated with the on-site vehicle maintenance service through a cloud based telematics provider. The onboard telematics module is configured to send the current GPS coordinates of the target vehicle of the customer to the GPS-based proximity module.

Also, the onboard telematics module in the target vehicle of the customer can be configured to communicate with the security module of the first server associated with the on-site vehicle maintenance service through the cloud based telematics provider to receive and perform the functional commands including lock/unlock doors, give an alert, and turn engine on/off.

The GPS-based proximity module of the first server associated with the on-site vehicle maintenance service can be configured to receive the current GPS coordinates of the service vehicle from a client device associated with the service vehicle.

The second virtual verification key can be received from a client device associated with the customer. The second virtual key can be a security token supplied by a telematics provider to the client device associated the customer and then by the client device associated with the customer to the security module. The security module of the first server associated with the on-site vehicle maintenance service can be configured to send the security token and the functional commands to the telematics provider. The security token can be used by a verification module of the telematics provider to verify/authenticate the customer and the target vehicle of the customer before sending the functional command to the onboard telematics module of the target vehicle.

High Level Description of the On-Site Vehicle Maintenance Service Processes

Figure 6A:
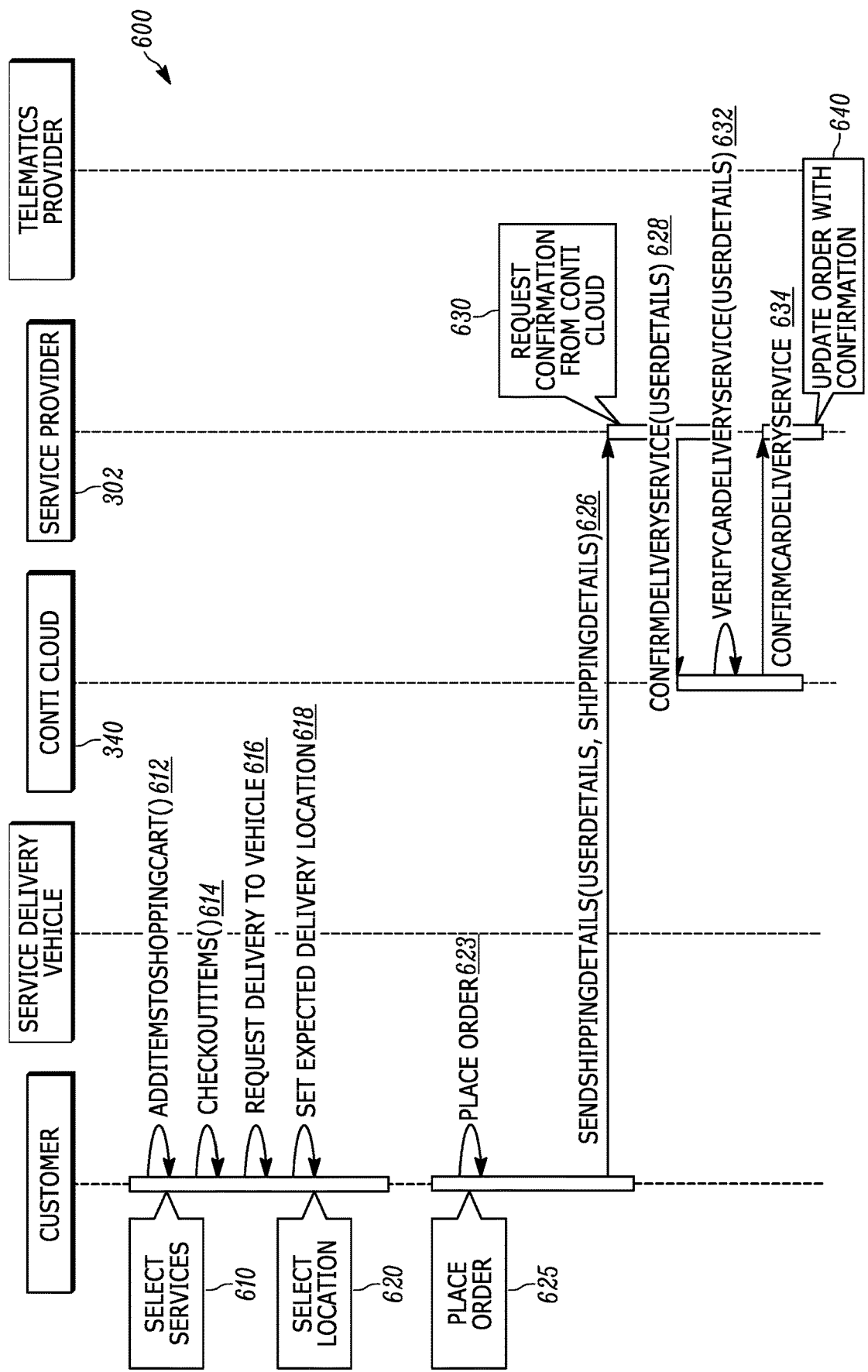
FIGS. 6A-6B illustrate flow diagrams of embodiment of the alternative vehicle maintenance system.
Figure 6B:
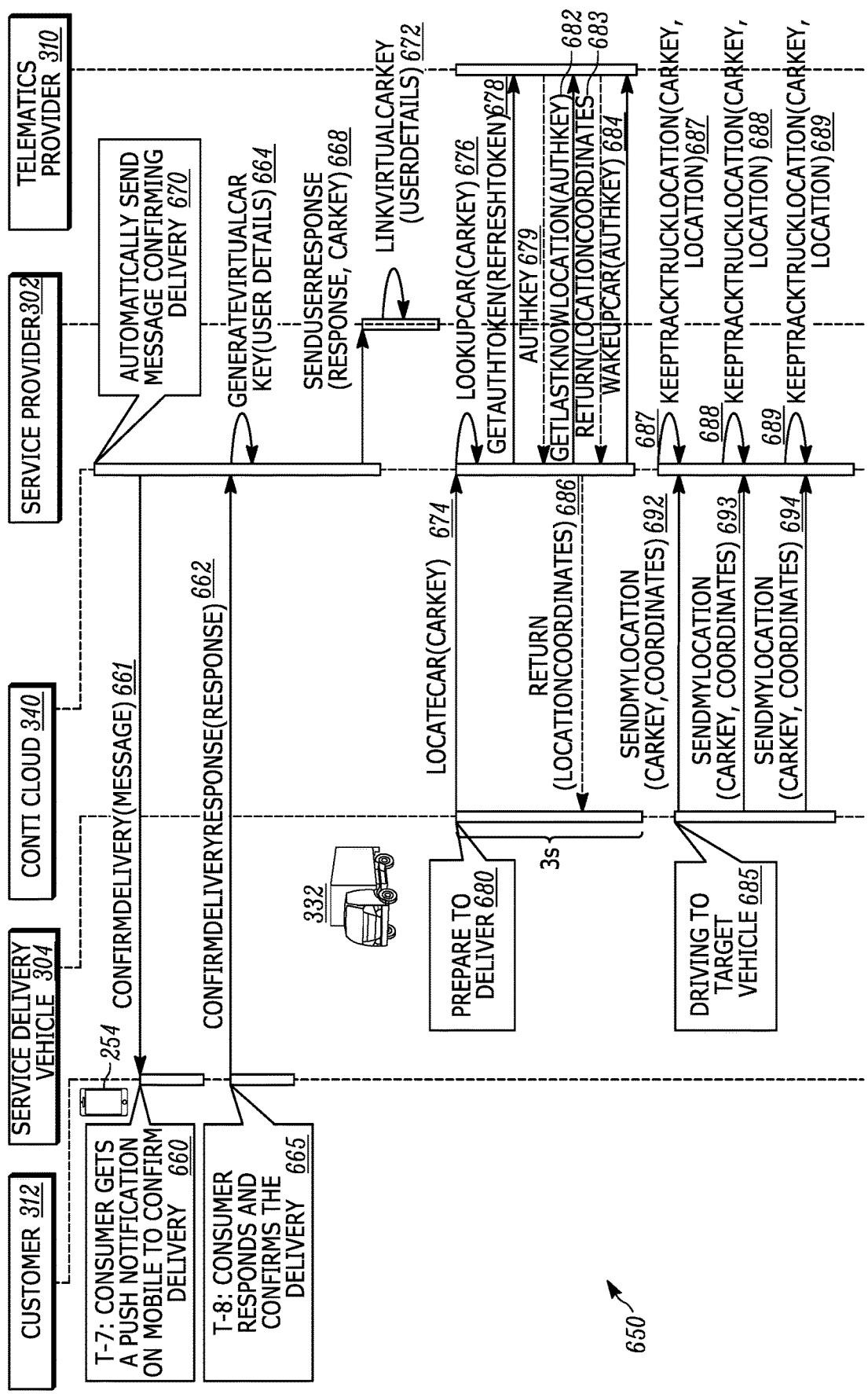

FIGS. 6A-6B illustrate flow diagrams of embodiment of the alternative vehicle maintenance system.

i) Registration and purchase: There are multiple time periods and methods a customer can select to register with the on-site vehicle maintenance service. Upon registering, a first database in the one or more databases may be also configured to contain and index information regarding for each user including: User ID and password for the on-site vehicle maintenance service, User name, email, etc., security questions, vehicle VIN, vehicle model, color and year, and other similar information.

1) When purchasing a new car at the dealership with a telematics system built into the vehicle the following steps are performed: i) the customer is offered to sign-up for the on-site vehicle maintenance service, ii) the customer signs up the application in the cloud based system of on-site vehicle maintenance service using electronic signature or prints the application and signs in paper form and then the customer downloads the mobile app into their client device, iii) the customer logs-in to the mobile app at least once to activate the service application in the cloud based system of on-site vehicle maintenance service. Next, the cloud based system of on-site vehicle maintenance service automatically tracks the Authentication Key (e.g., access token) and Refresh Key for the user and stores it as part of the registration.

2) A customer may register using the Application by i) using the app to sign up, ii) The app collects the registration information for the telematics system site (e.g. OnStar's Backend site) from the user and passes it to the telematics system site, (mobile application or the cloud-based on-site vehicle maintenance service does not store this information in the cloud system), iii) the telematics system site finishes the registration and returns the Authentication Key and Refresh Key, and lastly iv) the cloud-based on-site vehicle maintenance service stores the Authentication Key and Refresh Key as part of the registration. The customer/user is then offered a dongle module to be installed in the vehicle having the VIN.

3) When an already existing User registers, the mobile app collects the username and password from the telematics system site customer, signs up the customer, and the telematics system site returns the Authentication Key and Refresh Key. The cloud-based on-site vehicle maintenance service stores the Authentication Key and Refresh Key as part of the registration.

Alternatively, the customer's vehicle having the VIN, may not have a telematics module or the customer may not intend to use the services of the telematics provider. In that event, a dongle module can be installed by the customer or by the provider of the cloud based system of on-site vehicle maintenance service in the vehicle having the VIN. When the dongle module is used for service delivery to the target vehicle, the access token is provided by the dongle module. The access token can be a valid rolling security key of the Body Control Module.

4) The shopping experience may be as follows. A customer selects on a website of a maintenance and service provider, one or more vehicle maintenance and service jobs. The customer selects one or more vehicle maintenance and service jobs delivered in the field to a consumer's vehicle outside a shop of the maintenance and service provider. The alternative method of vehicle service to the consumer's vehicle outside the shop of the maintenance and service provider is processed. On the scheduled service delivery date, a service vehicle is directed to the consumer's vehicle's location. The consumer's vehicle is opened/unlocked to ensure the one or more vehicle maintenance and service jobs can be performed on the consumer's vehicle. A confirmation is send that the one or more vehicle maintenance and service jobs have been performed. After performing the one or more vehicle maintenance and service jobs, a confirmation is sent that the consumer's vehicle is closed and locked and the one or more vehicle maintenance and service jobs are complete.

ii) The service delivery person can use communications via Wi-Fi hotspots, the actuation module solution, and blue tooth exchanges between the internal intelligent software in the vehicle itself and the downloaded application resident on the client device.

1) For maintenance services marked for "in the field", the maintenance and service provider initiates a query process to the cloud based system of on-site vehicle maintenance service for verification of customer's account in the cloud based system of on-site vehicle maintenance service. The cloud based system of on-site vehicle maintenance service verifies the customer information who requested the service delivery and confirms that the customer has an active service account in the cloud based system of on-site vehicle maintenance service to allow for such a delivery. The on-site vehicle maintenance service cloud system then sends verification back to the maintenance and service provider site that the customer has a valid account.

iii) Shipping Experience

Service Delivery Planning

1) Prior to the delivery service provider's route planning, the cloud-based on-site vehicle maintenance service sends a push message (preferably early in the morning) to the customer's client device (e.g., cell phone of the customer) requesting confirmation for the service delivery to the vehicle with the Work Order details. The Customer confirms the service delivery to the vehicle by sending a message back to the cloud-based on-site vehicle maintenance service. Once the cloud-based on-site vehicle maintenance service receives the customer's confirmation for the service delivery to the vehicle, the cloud-based on-site vehicle maintenance service will generate a virtual Car Key (i.e., a virtual verification key). The cloud-based on-site vehicle maintenance service sends a virtual Car Key to the maintenance and service provider server. The virtual Car Key is issued with a limited shelf life and will expire even if not used within a defined window of time, such as 4 hours, e.g., from noon to 4:00 pm. The virtual Car Key is included in the communications transmitted by the maintenance and service provider, a client device of the service vehicle associated with the maintenance and service provider, or a client device of the service delivery person associated with the maintenance and service provider when communicating the cloud based system of on-site vehicle maintenance service. As described, the virtual Car Key that can be a public key is used by the on-site vehicle maintenance service cloud system to authenticate the received transmission through matching the public key with its associate private key.

Note, the dual key security protects against if either the virtual Car key or access token are compromised. The limited shelf life expiration protects against if BOTH the virtual Car Key and access token are compromised, they are only valid for a limited window of time established by the cloud-based on-site vehicle maintenance service. Thus, the security of the vehicle is protected in multiple ways. The maintenance and service provider system then links the virtual Car Key to the service delivery order. The maintenance and service provider systems are then ready to execute the service delivery to the Customer's vehicle.

Pre Service Delivery

2) The maintenance and service provider prepares the service to be delivered to the customer's car. The maintenance and service provider plans the delivery route based on either the address selected by the customer at the time of check-out or the current location of the vehicle. On service delivery day, the maintenance and service provider's service vehicle looks up the virtual Car Key associated with the order in the app. The maintenance and service provide contacts the cloud-based on-site vehicle maintenance service to get the current location of the car. The cloud-based on-site vehicle maintenance service then receives the last known location of the car and sends it back to the maintenance and service provide. If the current location of the vehicle can be fit in the delivery zone/maintenance area, the maintenance and service provider's system moves ahead with the service delivery. If not, then that service delivery is skipped and marked for a different day or the vehicle is started up and moved to a new maintenance area. The backend communicates with the local client device of the vehicle maintenance service to bypass the immobilization circuit of the vehicle to start the ignition and start up the vehicle.

Real-Time Tracking of the Delivery Service Provider's Vehicle

3) While tracking the maintenance and service provider's service vehicle driving toward the delivery location, an application in the service vehicle can notify the cloud-based on-site vehicle maintenance service of the service vehicle's location. The cloud-based on-site vehicle maintenance service anticipates the service delivery to the car and wakes up the vehicle's system by issuing a command. When the maintenance and service provider's vehicle approaches near the car (like 100 meters), the cloud-based on-site vehicle maintenance service automatically alerts the vehicle and the vehicle starts flashing lights and beeps a few times. This helps the maintenance and service provider's driver to locate the exact vehicle in a parking lot.

4) To unlock the car once maintenance and service provider's service vehicle reaches the target car, the application used by the delivery person uses the app to send an Unlock command. The cloud-based on-site vehicle maintenance service intercepts this command and issues an Unlock command to the telematics system site. The telematics system site triggers an unlock request in the car's telematics module by sending this Unlock command to electromechanically unlock a trunk and/or door of the vehicle. Alternatively, the cloud-based on-site vehicle maintenance service can issue a command to the dongle module of the car to unlock.

5) The service delivery person performs the vehicle maintenance and service jobs, closes the car door/trunk, and then uses the app to send a lock command. Like above, the cloud-based on-site vehicle maintenance service intercepts this command and issues a Lock command to the telematics system site. The telematics system site triggers a lock request in the car's telematics module by sending the lock command. Alternatively, the cloud-based on-site vehicle maintenance service can issue a lock command to the dongle module of the car.

6) A confirmation message is sent from the on-site vehicle maintenance service to client device of the customer. The service delivery process is completed when the on-site vehicle maintenance service destroys the virtual CarKey for the order. Additionally, for one vehicle maintenance and service operation, the GPS-based proximity module in the first server associated with the on-site vehicle maintenance service can be configure to monitor distances between multiple service vehicles and the target vehicle of the customer such that more than one service vehicle can be sent the same target vehicle.

The vehicle maintenance and service jobs include 1) oil change, 2) tire balance and rotation, 3) car washing, cleaning and detailing, 4) windshield change or fix, and 5) repairs that can be performed in the field.

Revenue

The user/customer may pay an additional fee on a per service instance to use the on-site vehicle maintenance service. The user/customer may pay a monthly or yearly subscription fee for all service deliveries to use the on-site vehicle maintenance service. The user/customer may pay based on another usage case model. A revenue sharing agreement may be in place between the maintenance and service provider, the cloud based system of on-site vehicle maintenance service, and the OEM provider. The maintenance and service provider may subsidize the "in the field" services to increase volume and make maintenance services more efficient. Advertisers may also subsidize the cost by inserting advertisements when placing orders. Combinations of the above may be used in the revenue generating processes for using the on-site vehicle maintenance service. The backend servers of the maintenance and service provider and the on-site vehicle maintenance service distribute the compensation. Alternatively, the "in the field" service delivery may alleviate the need of a maintenance and service provider to prepare additional shops when expanding and may bring down the costs.

FIGS. 8A-8D show embodiments of the multiple virtual keys and security token used by the cloud based system of on-site vehicle maintenance service. FIG. 9D, in addition to the cloud based system of on-site vehicle maintenance service, shows the user, the service vehicle, the telematics provider (OEM backend), and the target vehicle. The figure also shows the first virtual key 835A that is used for authenticating the commands/requests received from the service vehicle and the security token 836A that is used for authentication the user.

As discussed, the first virtual verification key is provided by the cloud based system of on-site vehicle maintenance service 340 using a secure communication to the maintenance and service provider. Then the maintenance and service provider can supply the first virtual key to a client device in the service vehicle 322 or to a client device of the service delivery person. The first virtual key can be used by the cloud based system of on-site vehicle maintenance service 340 to authenticate commands/request/data received from the service vehicle, the maintenance and service provider, and service delivery person when the received command/request/includes the first virtual key. In an example, the first virtual verification key is a public key generated by the cloud based system of on-site vehicle maintenance service 340 such that only the cloud based system of on-site vehicle maintenance service 340 knows an associated private key matching the public key and can authenticate the received command/request/data including the first virtual key. As described, the GPS coordinates of the service vehicle as well as a wakeup command can be received from the service delivery person/service vehicle. In an example (see FIGS. 3A-3C), the service delivery person 304 uses the service delivery application 315 in their client device to send the Work Order Number and the first virtual verification key in a message to the cloud based system of on-site vehicle maintenance service 340 in order to obtain the target vehicle's information including its current location information. The cloud based system of on-site vehicle maintenance service 340 can respond with a message to the service delivery application 315 in the client device of the delivery person 304 with the target vehicle's location information.

The technology may use a keyless remote entry code from the backend server to access the vehicle and/or bypasses the immobilization circuits to provide the on-demand and on-site vehicle maintenance service to a target vehicle. A handheld RF signal transmitter used by the on-site vehicle maintenance service has one or more ASICs to be highly configurable in generating a set of two or more stable RF signals at different frequency wavelengths, which is remote controlled by the software commands in the access control telegram message issued from a backend server. The handheld RF signal transmitter may also have a LF transponder to communicate with a immobilization circuit in the vehicle, using the protocol issued from a backend server.

Figure 10A:
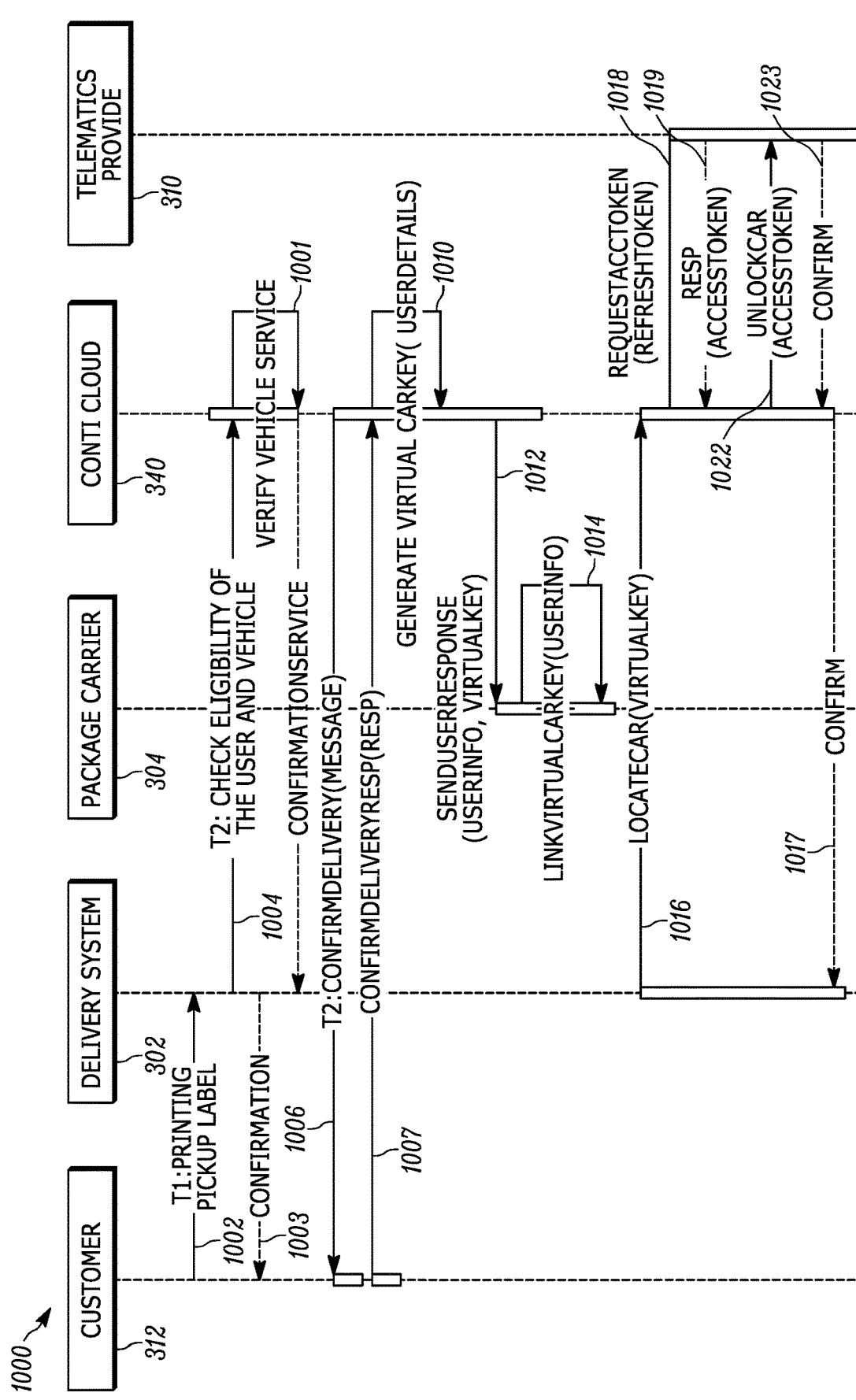
FIG. 10 illustrates a sequence diagram of an embodiment using on-site vehicle maintenance service for a vehicle of a customer.
Figure 10B:
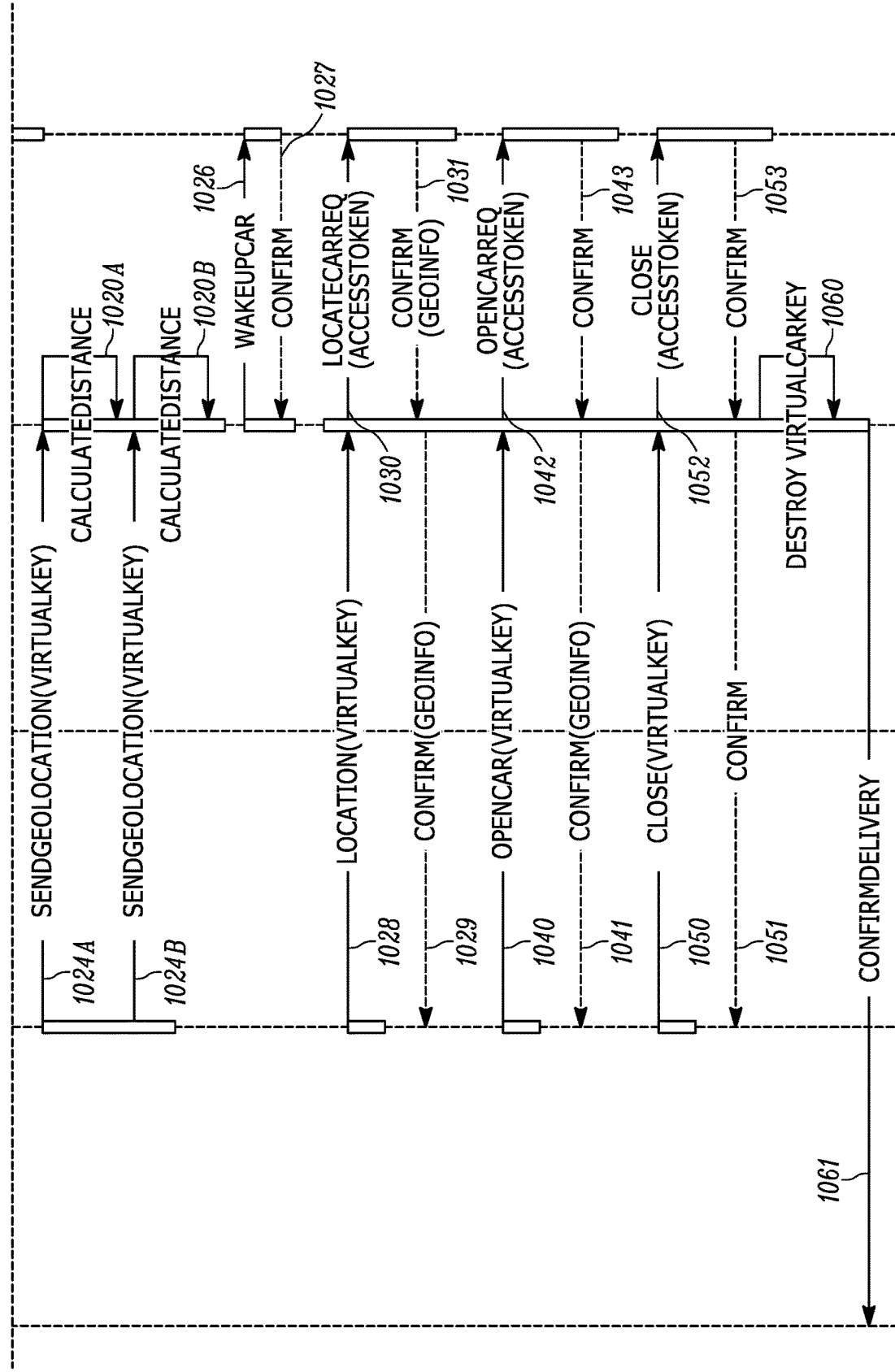

FIG. 10 illustrates another sequence diagram of embodiment of a service delivery using the cloud based system of on-site vehicle maintenance service. A user of the cloud-based on-site vehicle maintenance service can use the application resident on their client device to arrange a maintenance service to their vehicle. The application resident on their client device will collect the details and send the information to the cloud-based on-site vehicle maintenance service. Additionally, and/or alternatively, a maintenance and service provider web site presents a user interface or web page to collect the details for the user to arrange a maintenance service to their vehicle.

FIG. 11 illustrates a user interface for selecting by a customer on a website of a maintenance and service provider, one or more vehicle maintenance and service jobs including an "in the field service". The customer/user may use a mobile app to select and pay for one or more maintenance and repair services including service to be performed "in the field". Alternatively, the customer can go to a website of the maintenance and service provider and select maintenance and/or repair jobs.

Computing System

FIG. 1 illustrates a block diagram of an example computing system that may be used in an embodiment of one or more of the servers, in-vehicle electronic modules, and client devices discussed herein. The computing system environment 800 is only one example of a suitable computing environment, such as a client device, server, in-vehicle electronic module, etc., and is not intended to suggest any limitation as to the scope of use or functionality of the design of the computing system 810. Neither should the computing environment 800 be interpreted as having any dependency or requirement relating to any one or combination of components illustrated in the exemplary operating environment 800.

With reference to FIG. 1, components of the computing system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computing system 810 typically includes a variety of computing machine readable media. Computing machine readable media can be any available media that can be accessed by computing system 810 and includes both volatile and nonvolatile media, removable and non-removable media. By way of example, and not limitation, computing machine readable mediums uses include storage of information, such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computing device 800. However, carrier waves would not fall into a computer readable medium. Communication media typically embodies computer readable instructions, data structures, program modules, or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computing system 810, such as during start-up, is typically stored in ROM 831. RAM 832 typically contains data and/or some instructions from applications that are immediately accessible to and/or presently being operated on by processing unit 820. By way of example, and not limitation, FIG. 1 illustrates operating system 834, other software 836, and program data 837.

The computing system 810 may also include other removable/non-removable volatile/nonvolatile computer storage media. By way of example only, FIG. 1 illustrates a hard disk drive 841 that reads from or writes to non-removable, nonvolatile magnetic media nonvolatile optical disk 856 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and a magnetic disk drive 851 and an optical disk drive 855 are typically connected to the system bus 821 by a removable memory interface, such as interface 850.

The drives and their associated computer storage media discussed above and illustrated in FIG. 1, provide storage of computer readable instructions, data structures, other software and other data for the computing system 810. In FIG. 1, for example, hard disk drive 841 is illustrated as storing operating system 844, other software 846, and program data 847. Note that these components can either be the same as or different from operating system 834, other software 836, and program data 837. Operating system 844, other software 846, and program data 847 are given different numbers here to illustrate that, at a minimum, they are different copies.

A user may enter commands and information into the computing system 810 through input devices such as a keyboard 862, a microphone 863, a pointing device 861, such as a mouse, trackball or touch pad. The microphone 863 may cooperate with speech recognition software. These and other input devices are often connected to the processing unit 820 through a user input interface 860 that is coupled to the system bus, but may be connected by other interface and bus structures, such as a parallel port, game port or a universal serial bus (USB). A display monitor 891 or other type of display screen device is also connected to the system bus 821 via an interface, such as a video interface 890. In addition to the monitor, computing devices may also include other peripheral output devices such as speakers 897 and other output device 896, which may be connected through an output peripheral interface 890.

The computing system 810 may operate in a networked environment using logical connections to one or more remote computers/client devices, such as a remote computing device 880. The remote computing device 880 may be a personal computer, a hand-held device, a server, a router, a network PC, a peer device or other common network node, and typically includes many or all of the elements described above relative to the computing system 810. The logical connections depicted in FIG. 1 include a local area network (LAN) 871 and a wide area network (WAN) 873, but may also include other networks. Such networking environments are commonplace in offices, enterprise-wide computer networks, intranets and the Internet. A browser application may be resident on the computing device and stored in the memory.

When used in a LAN networking environment, the computing system 810 is connected to the LAN 871 through a network interface or adapter 870. When used in a WAN networking environment, the computing system 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, other software depicted relative to the computing system 810, or portions thereof, may be stored in the remote memory storage device. By way of example, and not limitation, FIG. 1 illustrates remote application programs 885 as residing on remote computing device 880. It will be appreciated that the network connections shown are exemplary and other means of establishing a communications link between the computing devices may be used.

As discussed, the computing system may include a processor, a memory, a built in battery to power the computing device, an AC power input, potentially a built-in video camera, a display screen, a built-in Wi-Fi circuitry to wirelessly communicate with a remote computing device connected to network.

It should be noted that the present design can be carried out on a computing system such as that described with respect to FIG. 1. However, the present design can be carried out on a server, a computing device devoted to message handling, or on a distributed system in which different portions of the present design are carried out on different parts of the distributed computing system.

Another device that may be coupled to bus 811 is a power supply such as a battery and Alternating Current adapter circuit. As discussed above, the DC power supply may be a battery, a fuel cell, or similar DC power source that needs to be recharged on a periodic basis. The wireless communication module 872 may employ a Wireless Application Protocol to establish a wireless communication channel. The wireless communication module 872 may implement a wireless networking standard such as Institute of Electrical and Electronics Engineers (IEEE) 802.11 standard, IEEE std. 802.11-1999, published by IEEE in 1999.

Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Vehicle's Intelligent Transport Systems to Integrate with a Connected Network Environment A vehicle has hardware and software that can take control of the vehicle for a short period including activating electromechanical mechanisms that are part of the vehicle. The vehicle has hardware and software for networking between the cloud as well as potentially between other vehicles to cause related automation within the vehicle based on communications between the vehicle and the cloud and/or other vehicles. The vehicle's Cellular Interface system is configured to allow cellular phones access the automobile computer systems, interpret the information and show the text on the cellular phones display while simultaneously transmitting the retrieved information, as well as characteristic and states of the cellular phone used to access the vehicle computer system, to a global network that would alert parties who could assist or benefit from the retrieved automobile information. A cellular phone with a software application can establish a connection with the vehicle's on-board diagnostic computer and/or other on-board intelligent control systems.

The system can interface with a client device, such as a mobile phone, with the on-board computing system in the vehicle. The on-board diagnostic computing device may monitor a set of operational characteristics of a vehicle and communicate that diagnostic to both the driver and with the cloud. The information derived from this system can also be conveyed and processed on a mobile client device coupled with additional information and displayed on the mobile client device's display screen, while simultaneously transmitting this information over the Internet to be stored in a database.

At the point of communication negotiation, an application on the client device extracts position location from the vehicle's navigation system and transmits the response from the vehicle's navigation system and the location to a server ready to receive this information. Alternatively, an application can extract similar position information from GPS module internal to the client device itself.

In an embodiment, the standard for the automotive industry for vehicles may use is the SAE J1850 communications protocol, which utilizes variable pulse width modulation and pulse width modulation. This means that the width of the pulse determines whether it is a 1 or a 0. Most phones form communication with serial connections (RS-232, Infrared . . . etc) and wireless connection protocols (Bluetooth, Infrared . . . etc). These two protocols must be converted or bridged by some sort of microprocessor so the two communication methodologies can communicate with each other. This can be accomplished by using an integrated circuit that can be used to convert the OBD-II signal (which includes different protocols such as, but not limited to: J1850 VPW, J1850 PWM, ISO 9141-2, ISO 14230, ISO 15765) to one of the aforementioned phone communication formats.

Network Environment

FIGS. 2A-2B illustrate diagrams of an environment in which the cloud based on-site vehicle maintenance service may be hosted. The cloud based on-site vehicle maintenance service is hosted on a cloud-based provider site that contains one or more servers and one or more databases. FIG. 2A illustrates diagram 200 of a network environment in which the techniques described may be applied. The network environment 200 has a communications network 220 that connects server computing systems 204A through 204F, and at least one or more client computing systems 202A and 202B. As shown, there may be many server computing systems 204A through 204F and many client computing systems 202A through 202B connected to each other via the network 220, which may be, for example, the Internet. Note, that alternatively the network 220 might be or include one or more of: an optical network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who generally initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 202A and the server computing system 204A can both initiate and respond to communications, their communication may be viewed as peer-to-peer. Likewise, communications between the client computing systems 204A-204F, and the server computing systems 202A and 202B may be viewed as peer-to-peer if each such communicating device is capable of initiation and response to communication. Additionally, server computing systems 204A-204F also have circuitry and software to communication with each other across the network 220. One or more of the server computing systems 204A to 204F may be associated with a database such as, for example, the databases 206A to 206F. Each server may have one or more instances of a virtual server running on that physical server and multiple virtual instances may be implemented by the design. A firewall may be established between a client computing system 200A and the network 220 to protect data integrity on the client computing system 200A. Each server computing system 204A-204F may have one or more firewalls.

FIGS. 2A and 2B illustrate block diagrams of an embodiment of a cloud based on-site vehicle maintenance service hosted on the cloud based provider site that automates a vehicle maintenance and service operation to a vehicle. The cloud based on-site vehicle maintenance service is hosted on a cloud based provider site that contains one or more servers and one or more databases.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicated use of these resources. The user's cloud based site is given a virtual amount of dedicated space and bandwidth in the cloud. Cloud applications can be different from other applications in their scalability—which can be achieved by cloning tasks onto multiple virtual machines at run-time to meet changing work demand. Load balancers distribute the work over the set of virtual machines. This process is transparent to the cloud user, who sees only a single access point.

The cloud based on-site vehicle maintenance service is coded to utilize a protocol, such as Hypertext Transfer Protocol (HTTP), to engage in a request and response cycle with both a mobile device application resident on a client device as well as a web-browser application resident on the client device. The cloud based on-site vehicle maintenance service has one or more routines to automate a vehicle maintenance and service operation. The cloud based on-site vehicle maintenance service can be accessed by a mobile device, a desktop, a tablet device and other similar devices, anytime, anywhere. Thus, the cloud based on-site vehicle maintenance service hosted on a cloud based provider site is coded to engage in 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud based on-site vehicle maintenance service, and 5) combinations of these.

The cloud based on-site vehicle maintenance service has one or more application programming interfaces (APIs) with two or more of the maintenance and service provider, as well as application programming interfaces with two or more of the OEM 'remote access/connectivity' systems, such as telematics system sites, such as OnStar, Lexus Linksys, Ford Sync, Uconnect, MBConnect, BMWConnect, etc. The APIs may be a published standard for the connection to each OEM 'remote access/connectivity' system. The APIs may also be an open source API. One or more of the API's may be customized to closed/non-published APIs of a 'remote access/connectivity' site and/or maintenance and service provider site. The cloud-based on-site vehicle maintenance service is coded to establish a secure communication link between each maintenance and service provider and the cloud provider site. The cloud based on-site vehicle maintenance service is coded to establish a secure communication link between each telematics system site and the cloud provider site. The software service is coded to establish the secure communication link by creating a tunnel at the socket layer and encrypting any data while in transit between each maintenance and service provider and the provider site of cloud based on-site vehicle maintenance service as well as to satisfy any additional authentication mechanisms required by the direct lending institution, including but not limited to IP address white listing and token based authentication.

In an embodiment, the server computing system 204 may include a server engine, a web page management component, a content management component and a database management component. The server engine performs basic processing and operating system level tasks. The web page management component handles creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

In an embodiment of a server computing system to display information, such as a web page, etc.; an application including any program modules, when executed on the server computing system 204A, causes the server computing system 204A to display windows and user interface screens on a portion of a media space, such as a web page. A user via a browser from the client computing system 202A may interact with the web page, and then supply input to the query/fields and/or service presented by a user interface of the application. The web page may be served by a web server computing system 204A on any Hypertext Markup Language (HTML) or Wireless Access Protocol (WAP)

enabled client computing system 202A or any equivalent thereof. For example, the client mobile computing system 202A may be a smart phone, a touch pad, a laptop, a netbook, etc. The client computing system 202A may host a browser to interact with the server computing system 204A. Each application has a code scripted to perform the functions that the software component is coded to carry out such as presenting fields and icons to take details of desired information. Algorithms, routines, and engines within the server computing system 204A take the information from the presenting fields and icons and put that information into an appropriate storage medium such as a database. A comparison wizard is scripted to refer to a database and make use of such data. The applications may be hosted on the server computing system 204A and served to the browser of the client computing system 202A. The applications then serve pages that allow entry of details and further pages that allow entry of more details.

Telematics System

The telematics system uses telecommunications, vehicular technologies, electrical sensors, instrumentation, and wireless communications modules to allow communication with between the cloud and a vehicle. The telematics system site sends, receives and stores information via a telematics module to affect control on objects in the vehicle. Telematics includes but is not limited to Global Positioning System technology integrated with computers and mobile communications technology in automotive navigation systems. Telematics also includes cloud based interaction with an integrated hands-free cell phone system in the vehicle, wireless safety communication system in the vehicle, and automatic driving assistance systems.

A wireless communication circuit exchanges communication between the mobile client device and the vehicle. The wireless communication circuit executes instructions with the processor via a bus system. The wireless communication circuit can be configured to communicate to RF (radio frequency), satellites, cellular phones (analog or digital), Bluetooth®V, Wi-Fi, Infrared, Zigby, Local Area Networks (LAN), WLAN (Wireless Local Area Network), or other wireless communication configurations and standards. The wireless communication circuit allows the vehicle's intelligence systems such as the actuation (e.g., telematics) module and other diagnostic tools to communicate with other devices wirelessly. The wireless communication circuit includes an antenna built therein and being housed within the housing or can be externally located on the housing.

The Telecommunications and Informatics applied in wireless technologies and computational systems may be based on 802.11p. The IEEE standard in the 802.11 family and also referred to as Wireless Access for the Vehicular Environment (WAVE) is the primary standard that addresses and enhances Intelligent Transportation System.

An example telematics module sends commands and exchanges information other electronic circuits, electromechanical devices, and electromagnetic devices in the vehicle. The telematics module may operate in conjunction with computer-controlled devices and radio transceivers to provide precision repeatability functions (such as in robotics artificial intelligence systems) and emergency warning performance systems located in and exchanged between vehicles.

Additional intelligent vehicle technologies are car safety systems and self-contained autonomous electromechanical sensors to generate warnings that can be transmitted within a specified targeted area of interest, say within 100 meters of the emergency warning system for vehicles transceiver. In ground applications, intelligent vehicle technologies are utilized for safety and commercial communications between vehicles or between a vehicle and a sensor along the road.

The wireless communication circuits in the vehicle or in a client device are configured to give access to the mobile Internet via a cellular telephone service provider. The mobile Internet is wireless access that hands off the mobile client device or vehicle from one radio tower to another radio tower while the vehicle or device is moving across the service area. Also, in some instances Wi-Fi may be available for users on the move so that a wireless base station connects directly to an Internet service provider, rather than through the telephone system.

Scripted Code

In regards of viewing ability of an on-line site: the scripted code for the on-line site, such as a website, social media site, etc., is configured to adapted to be i) viewed on tablets and mobile phones, such as individual downloadable applications in data stores that are designed to interface with the on-line site, ii) viewable on a screen in the vehicle, as well as iii) viewable on a screen of a desktop computer via a browser. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like.

Mobile web applications and native applications can be downloaded from a cloud-based site. The mobile web applications and native applications have direct access to the hardware of mobile devices (including accelerometers and GPS chips), and the speed and abilities of browser-based applications. Information about the mobile phone and the vehicle's location is gathered by software housed on the phone.

One or more scripted routines for the cloud based on-site vehicle maintenance service are configured to collect and provide features such as those described herein.

Any application and other scripted code components may be stored on a non-transitory computing machine readable medium which, when executed on the server causes the server to perform those functions. The applications including program modules may be implemented as logical sequences of software code, hardware logic circuits, and any combination of the two, and portions of the application scripted in software code are stored in a non-transitory computing device readable medium in an executable format. In an embodiment, the hardware logic consists of electronic circuits that follow the rules of Boolean Logic, software that contain patterns of instructions, or any combination of both.

The design is also described in the general context of computing device executable instructions, such as applications etc. being executed by a computing device. Generally, software include routines, programs, objects, applications, widget, plug-ins, and other similar structures that perform particular tasks or implement particular abstract data types. Those skilled in the art can implement the description and/or figures herein as computer-executable instructions, which can be embodied on any form of computing machine readable media discussed herein.

Some portions of the detailed descriptions herein are presented in terms of algorithms/routines and symbolic representations of operations on data bits within a computer memory. These algorithmic descriptions and representations are the means used by those skilled in the data processing arts to most effectively convey the substance of their work to others skilled in the art. An algorithm/routine is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms/routine of the application including the program modules may be written in a number of different software programming languages such as C, C++, Java, HTML, or other similar languages.

Many online pages on a server, such as web pages, are written using the same language, Hypertext Markup Language (HTML), which is passed around using a common protocol—HTTP. HTTP is the common Internet language (dialect, or specification). Through the use of a web browser, a special piece of software that interprets HTTP and renders HTML into a human-readable form, web pages authored in HTML on any type of computer can be read anywhere, including telephones, PDAs and even popular games consoles. Because of HTTP, a client machine (like your computer) knows that it has to be the one to initiate a request for a web page; it sends this request to a server. A server may be a computing device where web sites reside—when you type a web address into your browser, a server receives your request, finds the web page you want, and sends it back to your desktop or mobile computing device to be displayed in your web browser. The client device and server may bilaterally communicate via a HTTP request & response cycle between the two.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

Although embodiments of this design have been fully described with reference to the accompanying drawings, it is to be noted that various changes and modifications will become apparent to those skilled in the art. Such changes and modifications are to be understood as being included within the scope of embodiments of this design as defined by the appended claims. The invention is to be understood as not limited by the specific embodiments described herein, but only by scope of the appended claims.

The invention claimed is:

1. A cloud based system for vehicle maintenance to a target vehicle, comprising: a cloud based on-site vehicle maintenance service hosted a cloud based provider site that includes one or more servers each having one or more processors, the servers are configured to communicate with one or more databases in the cloud based provider site; a GPS-based proximity module in a first server associated with the on-site vehicle maintenance service is configured to receive both current GPS coordinates of a service vehicle associated with a first vehicle maintenance, where the current GPS coordinates are used for at least one vehicle maintenance and service operation with the target vehicle of the customer, where both the current GPS coordinates of a service vehicle and the coordinates of the customer's target vehicle are stored in a first database of the cloud based provider site, wherein the GPS-based proximity module is configured to monitor a distance between the service vehicle and the target vehicle of the customer; a security module in the first server associated with the on-site vehicle maintenance service is configured to setup at least two or more vehicle maintenance and service operations including 1) directing the service vehicle to the target vehicle of the customer, 2) opening and/or unlocking the target vehicle of the customer to ensure one or more vehicle maintenance and service jobs can be performed on the target vehicle of the customer, 3) ensuring the one or more vehicle maintenance and service jobs have been performed, and 4) after performing the one or more vehicle maintenance and service jobs, ensuring the target vehicle of the customer is closed and locked and the one or more vehicle maintenance and service jobs are complete; and where the security module in cooperation with the GPS-based proximity module is further configured to send to the target vehicle of the customer one or more functional commands 1) to wake-up an on-board actuation module in the target vehicle of the customer while in a close proximity established by a first threshold distance between the service vehicle and the target vehicle of the customer, 2) to give an alert from the target vehicle of the customer while in a close proximity established by a second threshold distance between the service vehicle and the target vehicle of the customer, 3) to unlock a door of the target vehicle of the customer, 4) to turn on or off an engine of the target vehicle of the customer, and 5) to lock the doors of the target vehicle of the customer after i) verifying the engine of the target vehicle of the customer is turned off and ii) receiving a confirmation of a completion of the vehicle maintenance and service operation from the service vehicle;

wherein the GPS-based proximity module of the first server associated with the on-site vehicle maintenance service is configured to receive the current GPS coordinates of the service vehicle from a first client device associated with the service vehicle and the current GPS coordinates of the target vehicle of the customer from a second client device of the customer through a Wi-Fi or cellular communications; and wherein the first client device associated with the service vehicle is configured to communicate with the security module of the first server associated with the on-site vehicle maintenance service through the Wi-Fi or cellular communications to receive the functional commands, where the first client device is coupled to an RF circuitry of a key fob and is configured to perform the functional commands by transmitting RF signals that include the functional commands to a Body Control Module of the target vehicle of the customer.

2. The cloud based system of claim 1, wherein the on-board actuation module is one of i) an onboard telematics module installed in the target vehicle of the customer and configured to communicate with the GPS-based proximity module of the first server associated with the on-site vehicle maintenance service through a cloud based telematics provider, the onboard telematics module is configured to send the current GPS coordinates of the target vehicle of the customer to the GPS-based proximity module, or ii) a dongle module having a Wi-Fi or cellular communication circuit configured to establish a secure communication with the GPS-based proximity module of the first server of the cloud based provider site, the dongle module is coupled to a fault and diagnostic module installed in the target vehicle of the customer to retrieve diagnostic data including the current GPS coordinates of the target vehicle of the customer, the dongle module is configured to send the current GPS coordinates of the target vehicle of the customer to the GPS-based proximity module; wherein the GPS-based proximity module of the first server associated with the on-site vehicle maintenance service is configured to receive the current GPS coordinates of the service vehicle from a first client device associated with the service vehicle; wherein the onboard telematics module is also configured to communicate with the security module of the first server associated with the on-site vehicle maintenance service through the cloud based telematics provider to receive and perform the functional commands; and wherein the dongle module is also configured to communicate with the security module of the first server associated with the on-site vehicle maintenance service through the Wi-Fi or cellular communications to receive the functional commands, where the dongle module includes an RF circuitry of a key fob and is configured to perform the functional commands by transmitting RF signals that include the functional commands to a Body Control Module of the target vehicle of the customer.

3. A cloud based system for vehicle maintenance to a target vehicle, comprising: a cloud based on-site vehicle maintenance service hosted a cloud based provider site that includes one or more servers each having one or more processors, the servers are configured to communicate with one or more databases in the cloud based provider site; a GPS-based proximity module in a first server associated with the on-site vehicle maintenance service is configured to receive both current GPS coordinates of a service vehicle associated with a first vehicle maintenance, where the current GPS coordinates are used for at least one vehicle maintenance and service operation with the target vehicle of the customer, where both the current GPS coordinates of a service vehicle and the coordinates of the customer's target vehicle are stored in a first database of the cloud based provider site, wherein the GPS-based proximity module is configured to monitor a distance between the service vehicle and the target vehicle of the customer; a security module in the first server associated with the on-site vehicle maintenance service is configured to setup at least two or more vehicle maintenance and service operations including 1) directing the service vehicle to the target vehicle of the customer, 2) opening and/or unlocking the target vehicle of the customer to ensure one or more vehicle maintenance and service jobs can be performed on the target vehicle of the customer, 3) ensuring the one or more vehicle maintenance and service jobs have been performed, and 4) after performing the one or more vehicle maintenance and service jobs, ensuring the target vehicle of the customer is closed and locked and the one or more vehicle maintenance and service jobs are complete; and where the security module in cooperation with the GPS-based proximity module is further configured to send to the target vehicle of the customer one or more functional commands 1) to wake-up an on-board actuation module in the target vehicle of the customer while in a close proximity established by a first threshold distance between the service vehicle and the target vehicle of the customer, 2) to give an alert from the target vehicle of the customer while in a close proximity established by a second threshold distance between the service vehicle and the target vehicle of the customer, 3) to unlock a door of the target vehicle of the customer, 4) to turn on or off an engine of the target vehicle of the customer, and 5) to lock the doors of the target vehicle of the customer after i) verifying the engine of the target vehicle of the customer is turned off and ii) receiving a confirmation of a completion of the vehicle maintenance and service operation from the service vehicle, wherein before sending the functional commands to the target vehicle of the customer, the security module in the first server associated with the on-site vehicle maintenance service receives at least two virtual verification keys, a first virtual verification key from a first client device associated with the service vehicle and a second virtual verification key from a second client device associated with the customer;

wherein the first virtual verification key is given a first shelf life and the second virtual verification key is given a second shelf life such that sending of the functional commands stay within an overlap window of time between the first shelf life and the second shelf life; wherein the first virtual key is a public key selected from a pool of virtual keys in a first database associated with the on-site vehicle maintenance service and is supplied through the first maintenance and service provider to the first client device of the service vehicle, the pool of virtual keys including one or more public keys and associated private keys, where the received first virtual key is used by the security module of the first server associated with the on-site vehicle maintenance service to authenticate communications received from the service vehicle; and wherein the second virtual key is received from a second client device associated with the customer, the second virtual key is either 1) a security token supplied by a telematics provider to the second client device associated the customer and then by the second client device associated with the customer to the security module, where the security module is configured to send the security token and the functional commands to the telematics provider, where the security token is used by a verification module of the telematics provider to verify the customer and the target vehicle of the customer before sending the command to an onboard telematics module of the target vehicle, or 2) a rolling security key of a Body Control Module (BCM) of the target vehicle of the customer, where the rolling security key is used by the security module of the first server associated with the on-site vehicle maintenance service to generate a next rolling security key for the Body Control Module of the target vehicle of the customer to be sent to the first client device associated with the service vehicle and to be used by a maintenance person of the service vehicle for sending the functional commands to the Body Control Module of the target vehicle of the customer, where the first client device associated with the service vehicle is configured to act as a universal key fob simulator for transmitting RF signals that include the functional commands along with the next rolling security key.

4. The cloud based system of claim 3, wherein the on-board actuation module is one of i) an onboard telematics module installed in the target vehicle of the customer and configured to communicate with the GPS-based proximity module of the first server associated with the on-site vehicle maintenance service through a cloud based telematics provider, the onboard telematics module is configured to send the current GPS coordinates of the target vehicle of the customer to the GPS-based proximity module, or ii) a dongle module having a Wi-Fi or cellular communication circuit configured to establish a secure communication with the GPS-based proximity module of the first server of the cloud based provider site, the dongle module is coupled to a fault and diagnostic module installed in the target vehicle of the customer to retrieve diagnostic data including the current GPS coordinates of the target vehicle of the customer, the dongle module is configured to send the current GPS coordinates of the target vehicle of the customer to the GPS-based proximity module; wherein the GPS-based proximity module of the first server associated with the on-site vehicle maintenance service is configured to receive the current GPS coordinates of the service vehicle from a first client device associated with the service vehicle; wherein the onboard telematics module is also configured to communicate with the security module of the first server associated with the on-site vehicle maintenance service through the cloud based telematics provider to receive and perform the functional commands; and wherein the dongle module is also configured to communicate with the security module of the first server associated with the on-site vehicle maintenance service through the Wi-Fi or cellular communications to receive the functional commands, where the dongle module includes an RF circuitry of a key fob and is configured to perform the functional commands by transmitting RF signals that include the functional commands to a Body Control Module of the target vehicle of the customer.

5. A cloud based system for vehicle maintenance to a target vehicle, comprising: a cloud based server having at least one processor to execute instructions, and a GPS-based proximity system to control and track multiple actions, which includes 1) a first module configured to monitor and track a GPS-based proximity between a client device associated with a service vehicle and the target vehicle of a customer, where the client device has an application resident in the client device to establish communication with the cloud based server and transmit its current GPS coordinates; and 2) a second module configured to initiate a request to an on-board actuation system installed in the target vehicle of the customer to perform electro mechanical operations in the target vehicle of the customer based on the monitored GPS-based proximity between the client device associated with service vehicle and the target vehicle of the customer; wherein the first module in the GPS-based proximity system is further configured to establish a first threshold distance between the client device associated with the service vehicle and the target vehicle of the customer before initiating a first request to the on-board actuating system in the target vehicle to give an alert from the target vehicle of the customer by activating the target vehicle's alarm system, and to establish a second threshold distance between the client device associated with the service vehicle and the target vehicle of the customer before initiating a second request to the on-board actuation system in the target vehicle to unlock doors of the target vehicle of the customer, and to establish a third threshold distance between the client device associated with the service vehicle and the target vehicle of the customer before initiating a third request to the on-board actuation system in the target vehicle to turn on an engine of the target vehicle of the customer.

6. A non-transitory machine readable medium containing instructions executable by one or more processors to enable at least one vehicle maintenance and service operation for a vehicle, comprising:
providing one or more application programming interfaces between two or more maintenance and service providers and two or more OEM remote access/connectivity systems; using the one or more application programming interfaces to establish communications with an onboard actuation module in the vehicle, where the one or more application programming interfaces are provided by a server associated with a cloud based on-site vehicle maintenance service;
upon receiving a notification about the vehicle maintenance and service jobs for the vehicle via the one or more application programming interfaces from a first maintenance and service provider, storing the notification including the Work Order Number (WON) and Vehicle Identification Number (VIN) in a database associated with the cloud based on-site vehicle maintenance service and registering that request; upon registering the vehicle maintenance and service jobs, sending a notification to the user via either a mobile application or a desktop application on their client device to confirm with the User their desire to have vehicle maintenance and service jobs with the WON to their vehicle having the VIN; receiving a response indicating a permission and/or confirmation from the user via either the mobile application or the desktop application on their client device, where the response provides the user's name and password for the OEM remote access/connectivity system to the cloud based on-site vehicle maintenance service; sending a request via the one or more application programming interfaces to wake the vehicle's onboard actuation module when a service vehicle commissioned with the Work Order Number is in close proximity established by a first threshold distance to a target vehicle matching the VIN; and sending a request via the one or more application programming interfaces to unlock the vehicle via the vehicle's onboard actuation module when an indication is received that a service person is ready to perform a maintenance and service job.

7. A server for a vehicle maintenance and service operation; comprising:
a first module configured to provide one or more application programming interfaces between two or more maintenance and service providers and two or more OEM remote access/connectivity system providers; a first input socket to receive a notification about a first maintenance and service job to a target vehicle via the one or more application programming interfaces from a first maintenance and service provider; a second module configured to communicate with a database to store the notification including a Work Order Number (WON) and a Vehicle Identification Number (VIN) and to register the first maintenance and service job for the target vehicle; a third module configured to, upon registering the first maintenance and service job, send a notification to the user via either a mobile application or a desktop application on their client device to confirm with the User their desire to have the first maintenance and service job having the WON performed on their target vehicle with the VIN; a fourth module configured to use the one or more application programming interfaces to establish wireless communications with an onboard actuation module in the target vehicle, where the fourth module is configured to send a request via the one or more application programming interfaces to wake the target vehicle's onboard actuation module when a service vehicle commissioned to perform the first maintenance and service job having the WON is in close proximity established by a first threshold distance to the target vehicle matching the VIN; and where the fourth module is also configured to send a request via the one or more application programming interfaces to unlock the trunk and/or doors of the target vehicle via the target vehicle's onboard actuation module when an indication is received that a maintenance person of the service vehicle is ready to perform the first maintenance and service job.

8. A vehicle alert and access system for at least one vehicle maintenance and service operation, comprising: a GPS-based proximity system to control and track multiple actions including 1) initiating wireless communications with an intelligent vehicle controller of a target vehicle in order to wake up the vehicle via its associated installed intelligent vehicle controller; 2) initiating a request for the intelligent vehicle controller to perform electro mechanical operations in the vehicle including at least one of i) unlocking a door, ii) locking a door, iii) opening a window, iv) closing a window, v) unlocking a trunk, vi) closing a trunk, vii) opening a sunroof, viii) closing a sunroof, ix) turning engine on, and x) turning engine off; and 3) detecting when the service vehicle is at a pre-established distance away from the target vehicle, then initiating a request for the intelligent vehicle controller to indicate a locked or unlocked status of the doors and/or the trunk of the target vehicle and to indicate the on/off status of an engine of the target vehicle.

\* \* \* \* \*